(12) United States Patent
Si et al.

(10) Patent No.: US 12,082,213 B2
(45) Date of Patent: Sep. 3, 2024

(54) METHOD AND APPARATUS OF QUASI-COLOCATION ASSUMPTION DETERMINATION FOR PHYSICAL DOWNLINK SHARED CHANNEL

(71) Applicant: Samsung Electronics Co., Ltd., Suwon-si (KR)

(72) Inventors: Hongbo Si, Plano, TX (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 360 days.

(21) Appl. No.: 17/653,821

(22) Filed: Mar. 7, 2022

(65) Prior Publication Data

US 2022/0295529 A1    Sep. 15, 2022

Related U.S. Application Data

(60) Provisional application No. 63/181,767, filed on Apr. 29, 2021, provisional application No. 63/178,942, (Continued)

(51) Int. Cl.
*H04W 72/12* (2023.01)
*H04L 5/00* (2006.01)
(Continued)

(52) U.S. Cl.
CPC ........... *H04W 72/23* (2023.01); *H04L 5/0048* (2013.01); *H04L 27/26035* (2021.01)

(58) Field of Classification Search
CPC ......................... H04W 72/1289; H04W 72/23; H04L 5/0048; H04L 5/0021; H04L 5/0026; H04L 27/26035; H04L 27/2613
See application file for complete search history.

(56) References Cited

U.S. PATENT DOCUMENTS

2019/0052425 A1   2/2019  Kim et al.
2019/0281587 A1   9/2019  Zhang et al.
(Continued)

FOREIGN PATENT DOCUMENTS

EP    3591881 A1    1/2020
KR    20190017640 A    2/2019

OTHER PUBLICATIONS

International Search Report and Written Opinion issued Jun. 9, 2022 regarding Application No. PCT/KR2022/003321, 6 pages.
(Continued)

*Primary Examiner* — Rasheed Gidado

(57) ABSTRACT

Methods and apparatuses in a wireless communication system is provided. A method for operating a user equipment (UE) includes receiving a set of higher layer parameters and downlink control information (DCI); determining, based on the set of higher layer parameters, whether a field is present; and determining, from the DCI, a first set of antenna ports for de-modulation reference signal (DM-RS) associated with a first physical downlink shared channel (PDSCH). The method further includes, in response to a determination that the field is present, determine that a second set of antenna ports for DM-RS are not associated with a second PDSCH for another UE and receiving the first PDSCH over a downlink channel. The second set of antenna ports for DM-RS: are orthogonal to, have a same resource element mapping as; and have a different frequency domain orthogonal cover code (FD-OCC) from the first set of antenna ports for DM-RS.

20 Claims, 17 Drawing Sheets

Related U.S. Application Data filed on Apr. 23, 2021, provisional application No. 63/159,247, filed on Mar. 10, 2021.

(51) Int. Cl.
*H04L 27/26* (2006.01)
*H04W 72/23* (2023.01)

(56) References Cited

U.S. PATENT DOCUMENTS

| | | | |
|---|---|---|---|
| 2020/0053757 A1 | 2/2020 | Bagheri et al. | |
| 2020/0196304 A1* | 6/2020 | Han | H04W 72/21 |
| 2020/0229161 A1 | 7/2020 | Raghavan et al. | |
| 2020/0267718 A1* | 8/2020 | Park | H04L 1/1861 |

OTHER PUBLICATIONS

Nokia et al., "PDSCH/PUSCH enhancements", 3GPP TSG RAN WG1 #104-e, R1-2100261, Jan. 2021, 24 pages.
"3rd Generation Partnership Project; Technical Specification Group Radio Access Network; NR; Physical channels and modulation (Release 16)", 3GPP TS 38.211 V16.1.0, Mar. 2020, 130 pages.
"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)", 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
Extended European Search Report issued Sep. 14, 2023 regarding Application No. 22767513.9, 14 pages.
Moderator (vivo), "Discussion summary #3 of [104-e-NR-52-71GHz-05]", 3GPP TSG RAN WG1 Meeting #104-e, R1-2102237, Jan. 2021, 112 pages.
Qualcomm Incorporated, "PDSCH and PUSCH enhancements for 52.6-71GHz band", 3GPP TSG-RAN WG1 #104-e, R1-2101457, Jan. 2021, 11 pages.
Moderator (vivo), "Discussion summary #3 of [104b-e-NR-52-71GHz-05]", 3GPP TSG RAN WG1 Meeting #104bis-e, R1-2104041, Apr. 2021, 76 pages.
Moderator (vivo), "Summary of PDSCH/PUSCH (Bandwidth/Timeline/Reference signals)", 3GPP TSG RAN WG1 Meeting #106-e, R1-2108212, Aug. 2021, 39 pages.

* cited by examiner

METHOD AND APPARATUS OF QUASI-COLOCATION ASSUMPTION DETERMINATION FOR PHYSICAL DOWNLINK SHARED CHANNEL

CROSS-REFERENCE TO RELATED APPLICATION AND CLAIM OF PRIORITY

This application claims priority under 35 U.S.C. § 119(e) to U.S. Provisional Patent Application No. 63/159,247 filed on Mar. 10, 2021; U.S. Provisional Patent Application No. 63/181,767 filed on Apr. 29, 2021; and U.S. Provisional Patent Application No. 63/178,942 filed on Apr. 23, 2021. The above-identified provisional patent applications are hereby incorporated by reference in their entirety.

TECHNICAL FIELD

The present disclosure relates generally to wireless communication systems and, more specifically, the present disclosure relates to quasi-colocation (QCL) assumption determination for physical downlink shared channel.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to quasi-colocation assumption determination for physical downlink shared channel.

In one embodiment, a base station (BS) in a wireless communication system is provided. The BS includes a transceiver configured to transmit, to a user equipment (UE), a set of higher layer parameters and downlink control information (DCI) and a processor operably coupled to the transceiver. The processor is configured to determine, based on the set of higher layer parameters, whether a field is present; determine, based on the DCI, a first set of antenna ports for de-modulation reference signal (DM-RS) associated with a first physical downlink shared channel (PDSCH); and in response to a determination that the field is present, determine that a second set of antenna ports for DM-RS are not associated with a second PDSCH for another UE. The second set of antenna ports for DM-RS: are orthogonal to the first set of antenna ports for DM-RS; have a same resource element mapping as the first set of antenna ports for DM-RS; and have a different frequency domain orthogonal cover code (FD-OCC) $w_f(k')$ from the first set of antenna ports for DM-RS. The transceiver is further configured to transmit the first PDSCH over a downlink channel.

In another embodiment, a UE in a wireless communication system is provided. The UE includes a transceiver configured to receive, from a BS, a set of higher layer parameters and DCI and a processor operably coupled to the transceiver. The processor is configured to determine, based on the set of higher layer parameters, whether a field is present; determine, from the DCI, a first set of antenna ports for DM-RS associated with a first PDSCH; and in response to a determination that the field from the set of higher layer parameters is present, determine that a second set of antenna ports for DM-RS are not associated with a second PDSCH for another UE. The second set of antenna ports for DM-RS: are orthogonal to the first set of antenna ports for DM-RS; have a same resource element mapping as the first set of antenna ports for DM-RS; and have a different FD-OCC $w_f(k')$ from the first set of antenna ports for DM-RS. The transceiver is further configured to receive the first PDSCH over a downlink channel.

In yet another embodiment, a method of a UE in a wireless communication system is provided. The method includes receiving, from a BS, a set of higher layer parameters and DCI; determining, based on the set of higher layer parameters, whether a field is present; and determining, from the DCI, a first set of antenna ports for DM-RS associated with a first PDSCH. The method further includes, in response to a determination that the field from the set of higher layer parameters is present, determine that a second set of antenna ports for DM-RS are not associated with a second PDSCH for another UE and receiving the first PDSCH over a downlink channel. The second set of antenna ports for DM-RS: are orthogonal to the first set of antenna ports for DM-RS; have a same resource element mapping as the first set of antenna ports for DM-RS; and have a different FD-OCC $w_f(k')$ from the first set of antenna ports for DM-RS.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13 illustrates an example diagram of a Type-2 DM-RS configuration according to embodiments of the present disclosure; and FIG. 14-16 illustrates an example diagram of a DM-RS configuration according to embodiments of the present disclosure.

DETAILED DESCRIPTION

Figure 1:
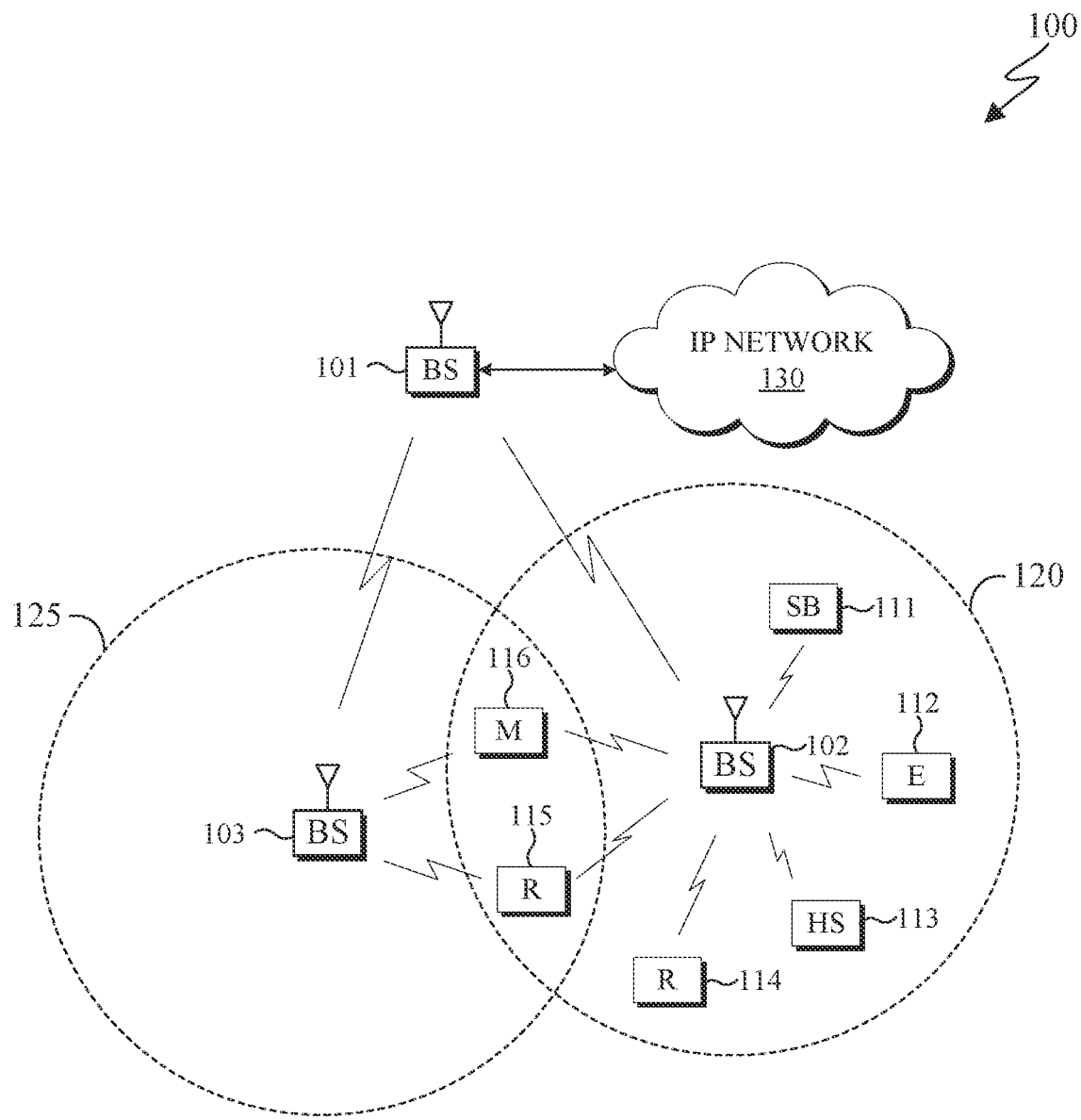
FIG. 1 illustrates an example wireless network according to embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.1.0, "NR; Physical channels and modulation" ("REF1"); 3GPP TS 38.212 v16.1.0, "NR; Multiplexing and channel coding" ("REF2"); 3GPP TS 38.213 v16.1.0, "NR; Physical layer procedures for control" ("REF3"); 3GPP TS 38.214 v16.1.0, "NR; Physical layer procedures for data" ("REF4"); and 3GPP TS 38.331 v16.1.0, "NR; Radio Resource Control (RRC) protocol specification" ("REF5").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
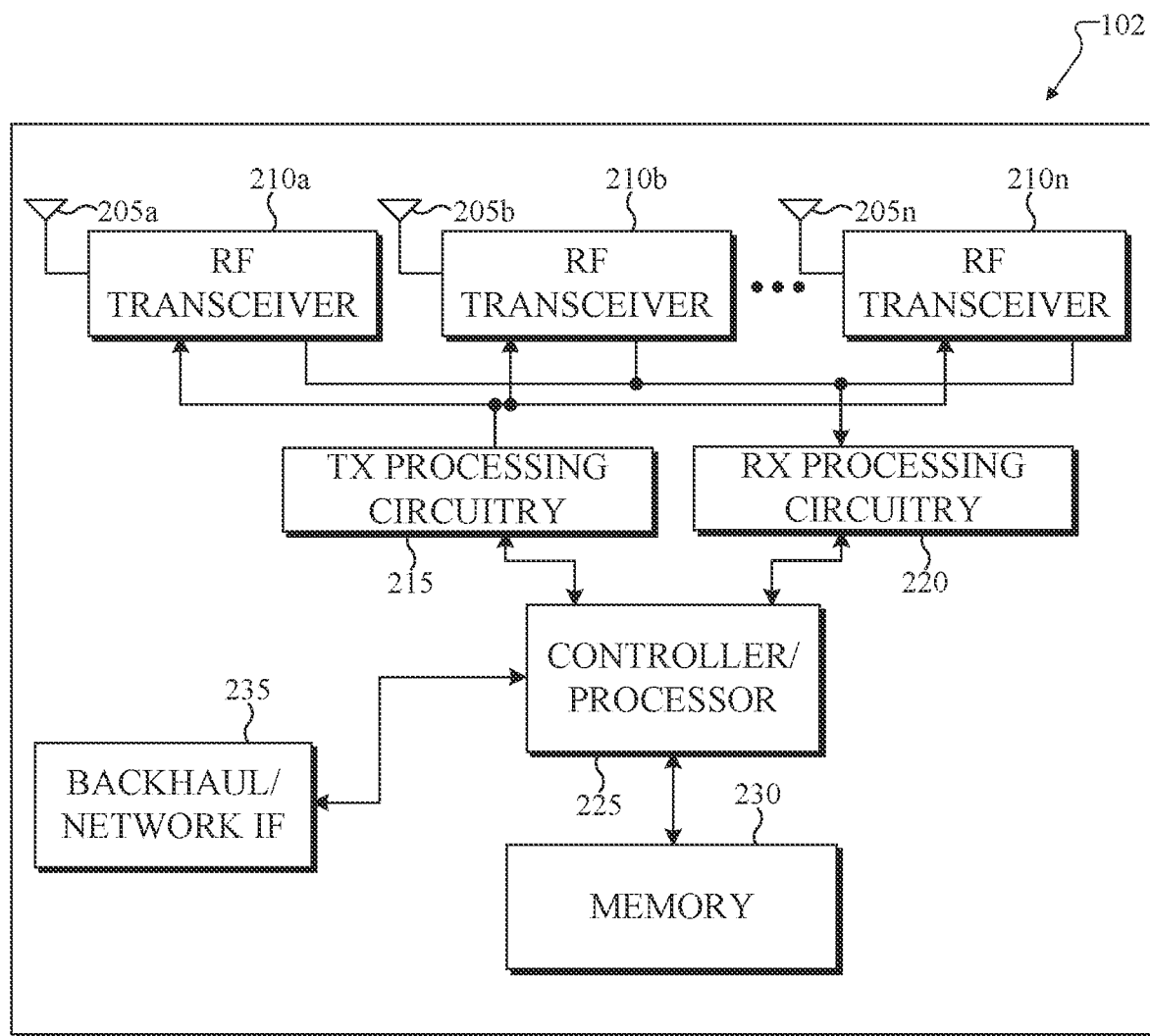
FIG. 2 illustrates an example BS according to embodiments of the present disclosure.
Figure 3:
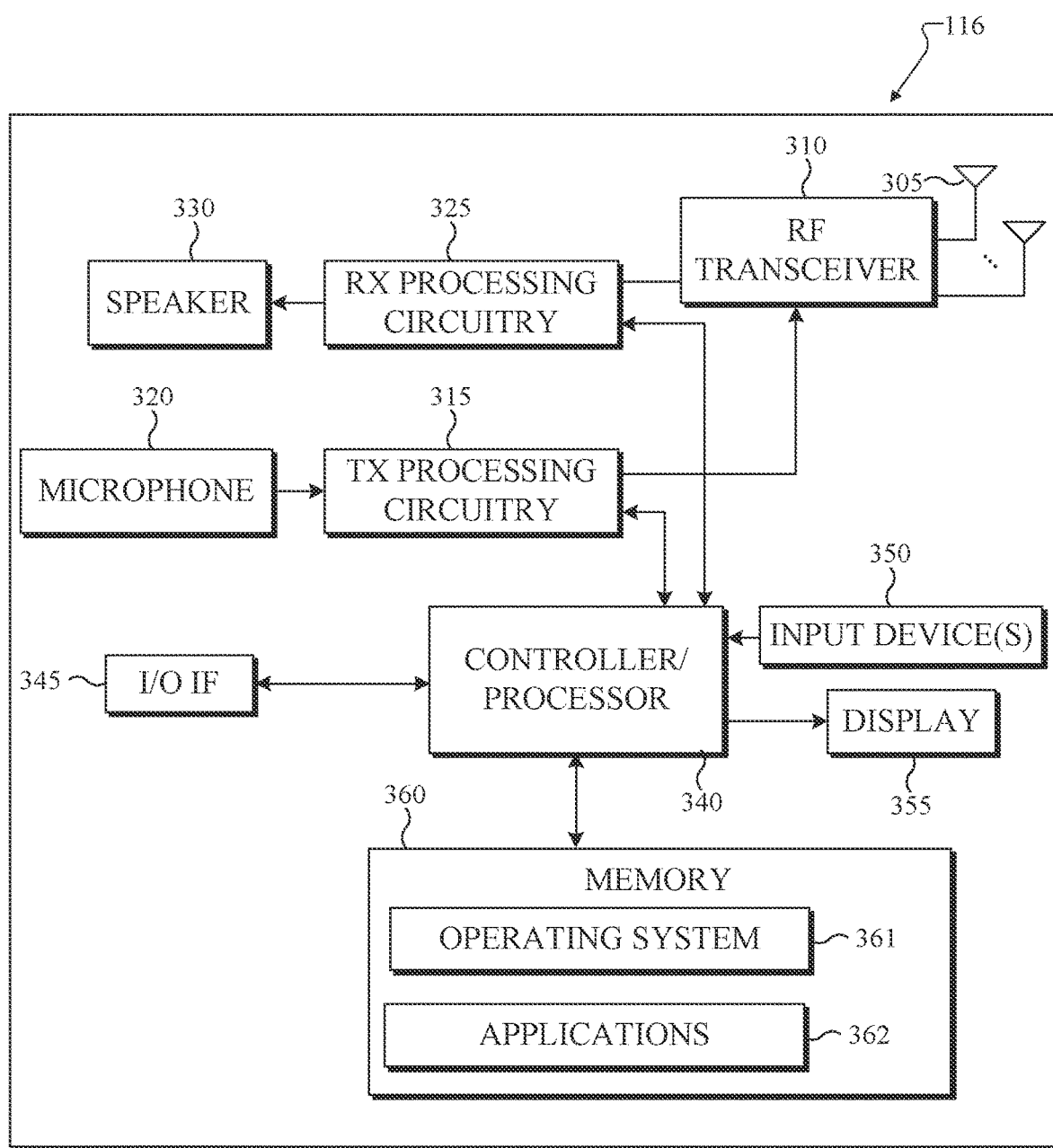
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programming, or a combination thereof for QCL assumption determination for a PDSCH. In certain embodiments, and one or more of the BSs 101-103 includes circuitry, programing, or a combination thereof for QCL assumption determination for PDSCH.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support QCL assumption determination for PDSCH. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an operating system (OS). The controller/processor 225 can move data into or out of the memory 230 as required by an executing process. In certain embodiments, the controller/processor 225 supports communication between entities, such as web real time communications (RTC). For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of a BS, such as the BS 102 (implemented using the RF transceivers 210a-210n, TX processing circuitry 215, and/or RX processing circuitry 220) support communication with aggregation of frequency division duplexing (FDD) cells and time division duplexing (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an OS 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
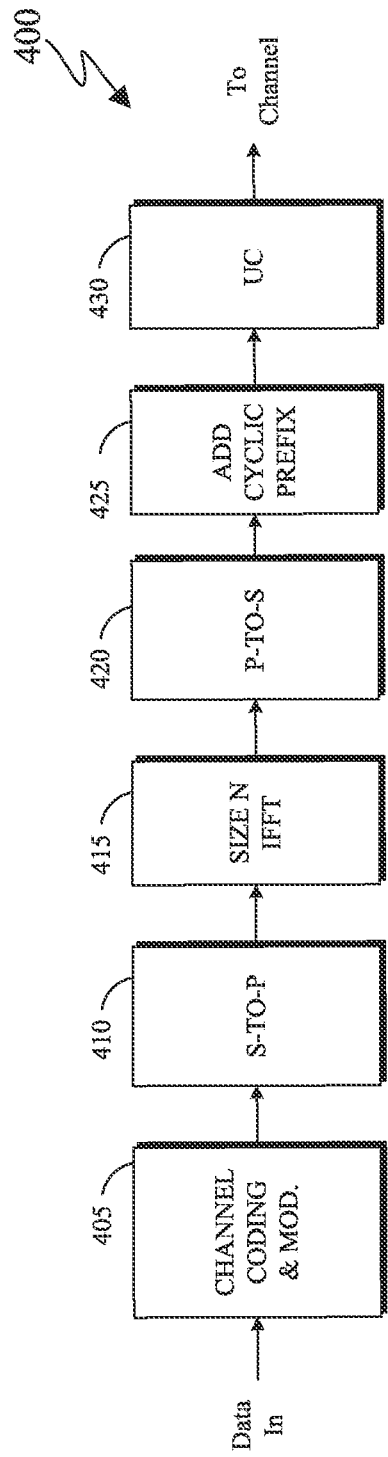
FIGS. 4 and 5 illustrate example wireless transmit and receive paths according to embodiments of the present disclosure.
Figure 5:
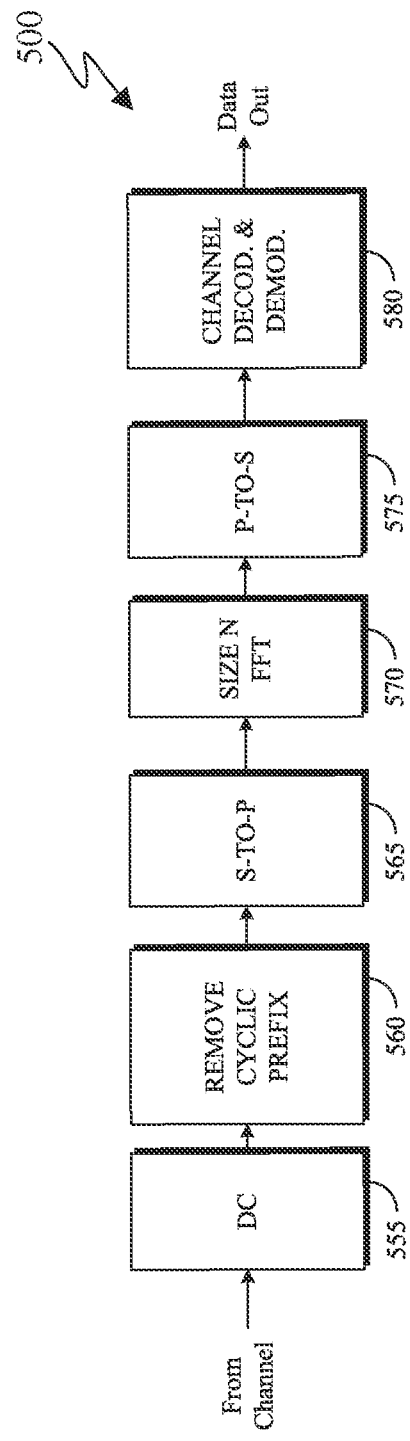

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support QCL assumption determination for PDSCH as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Embodiments of the present disclosure, such as those described in FIGS. 6-11 describe QCL assumption or transmission configuration indicator (TCI) state determination for multiple PDSCHs scheduled by a single downlink control information (DCI). For example various embodiments include (i) single TCI state indication in the DCI (such as described in FIGS. 6-8), (ii) multiple TCI states indication in the DCI, wherein there the multiple TCI states can be associated with one or multiple timing thresholds (such as described in FIGS. 9 and 10), and (iii) TCI state or QCL assumption determination for PDSCHs (such as described in FIG. 11).

In NR Rel-15 and Rel-16, a set of TCI states can be configured to a UE by RRC parameter, and an activation command can be sent to the UE later to indicate a set of active TCI states. The UE is also configured with a timing threshold (timeDurationForQCL) for the application of an indication of TCI state included in a DCI format scheduling a PDSCH.

In certain embodiments, when a UE (such as the UE 116) has received the configuration of TCI states and before receiving the activation command, the UE assumes the PDSCH is QCLed with the synchronization signal (SS) physical broadcast channel (PBCH) block received in the initial access procedure, if the offset between the physical downlink control channel (PDCCH) including the DCI and the scheduled PDSCH equals to or is larger than the timing threshold (timeDurationForQCL).

If the DCI does not have the TCI field present, and the offset between the PDCCH including the DCI and the scheduled PDSCH equals to or is larger than the timing threshold (timeDurationForQCL), the UE assumes the PDSCH is QCLed with or same TCI state as the PDCCH including the DCI.

If the offset between the PDCCH including the DCI and the scheduled PDSCH is smaller than the timing threshold (timeDurationForQCL), the UE assumes the PDSCH is QCLed with the PDCCH in the core resource set (CORESET) with the lowest ID in the latest slot having at least one CORESET to monitor.

For a higher frequency range, e.g. 52.6 to 71 GHz, one DCI can schedule more than one PDSCH, and hence the QCL determination method should be enhanced accordingly to support multiple PDSCH scheduled by single DCI.

Although exemplary descriptions and embodiments to follow assume OFDM or OFDMA, embodiments of this disclosure are not limited thereto As such. embodiments of the present disclosure can be extended to other OFDM-based transmission waveforms or multiple access schemes such as filtered OFDM (F-OFDM).

It is noted that the various embodiments covers several components which can (i) be used in conjunction or in combination with one another, or (ii) can operate as stand-alone schemes.

As used herein, a QCL assumption or QCL relationship included in a TCI state can be with one of the following four types. A first type, denoted as typeA, is based on {Doppler shift, Doppler spread, average delay, delay spread}. A second type, denoted as typeB, is based on {Doppler shift, Doppler spread}. A third type, denoted as typeC, is based on {Doppler shift, average delay}. A fourth type, denoted as typeD, is based on {Spatial Rx parameter}.

In one example, as described in this disclosure, when a QCL assumption is with respect to a SS/PBCH block as the reference, the QCL assumption can be with respect to 'typeA', and when applicable, also with respect to 'typeD'.

In another example, the approaches or examples in this disclosure (or both) are applicable if one or more of the TCI states configured for the serving cell scheduled by the search space set contains qcl-Type set to 'typeD'.

Embodiments of the present disclosure describe single TCI indicators in DCI. This is described in the following examples and embodiments, such as those of FIGS. 6-8.

Figure 6:
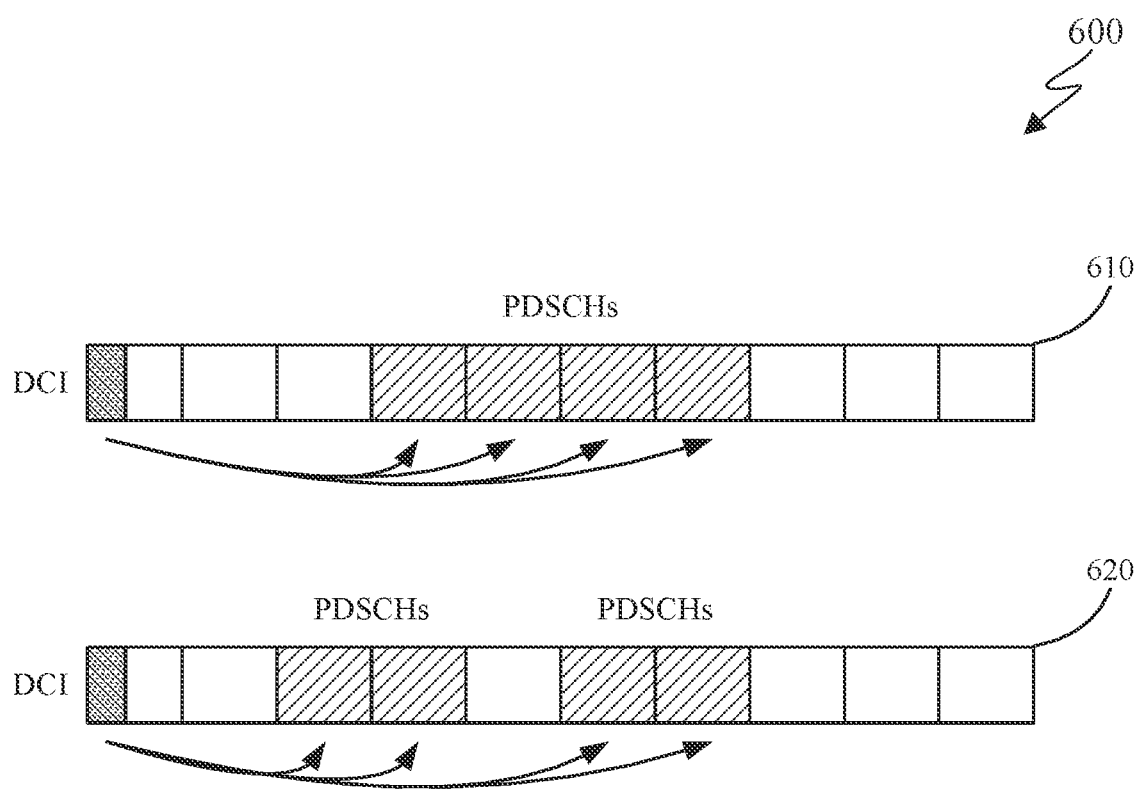
FIG. 6 illustrates an example diagram of multiple PDSCHs scheduled by one downlink control information (DCI) according to embodiments of the present disclosure.
Figure 7:
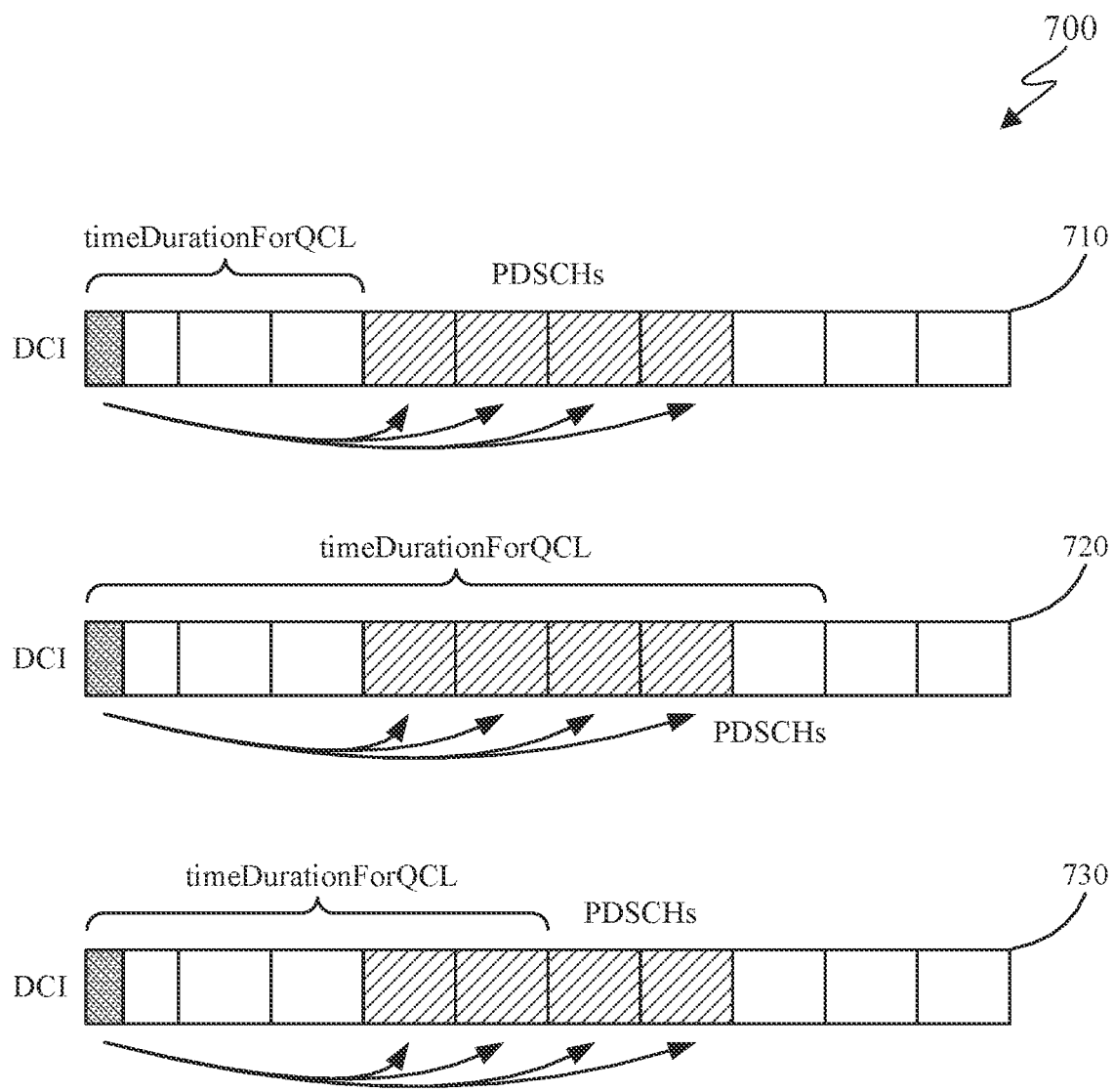
FIG. 7 illustrates an example diagram of example PDSCHs scheduled by one DCI with respect to a threshold timing according to embodiments of the present disclosure.
Figure 8:
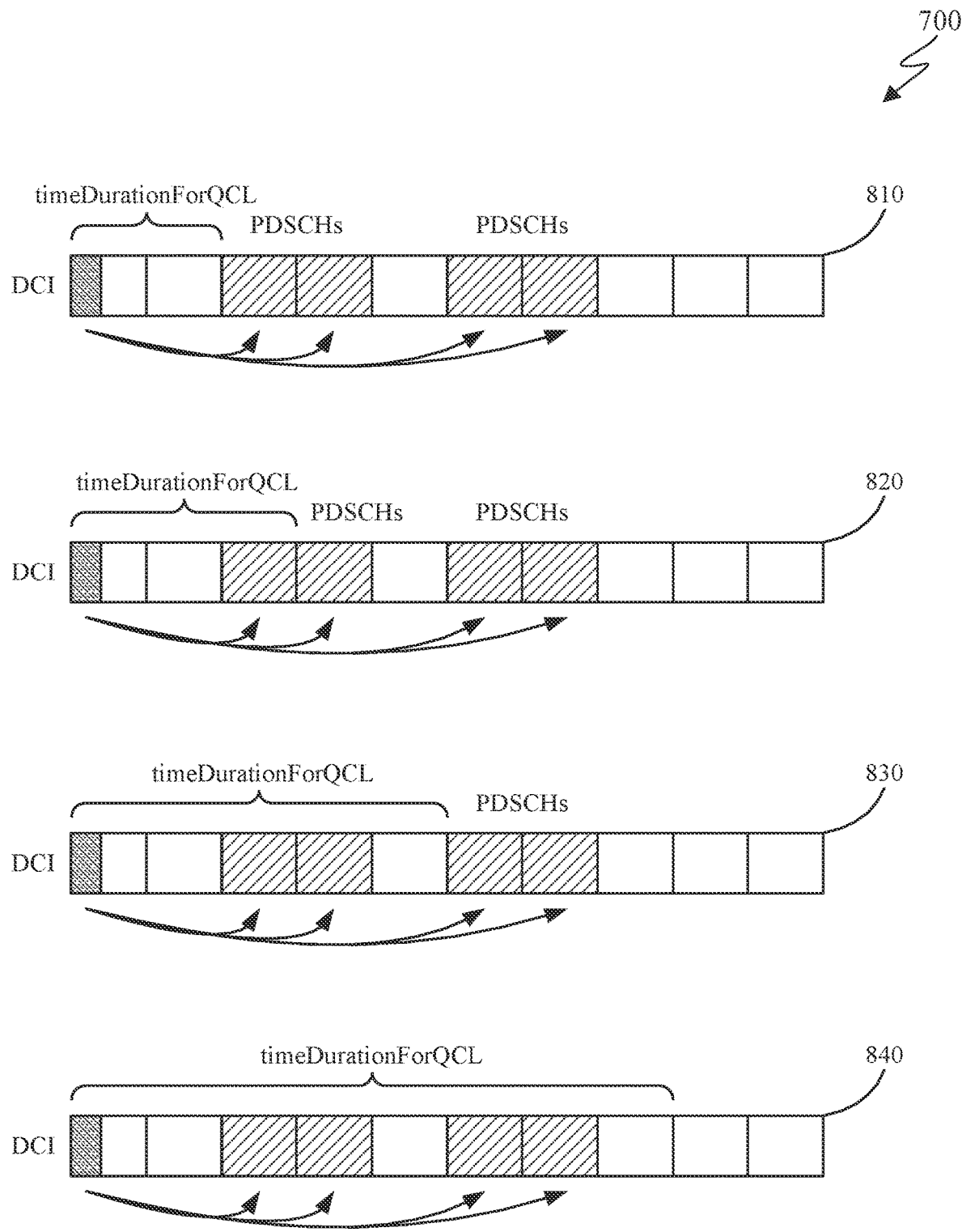
FIG. 8 illustrates an example diagram of example PDSCHs scheduled by one DCI with respect to a threshold timing according to embodiments of the present disclosure.

FIG. 6 illustrates an example diagram 600 of multiple PDSCHs scheduled by one DCI according to embodiments of the present disclosure. FIG. 7 illustrates an example diagram 700 of example PDSCHs scheduled by one DCI with respect to a threshold timing according to embodiments of the present disclosure. FIG. 8 illustrates an example diagram 800 of example PDSCHs scheduled by one DCI with respect to a threshold timing according to embodiments of the present disclosure.

The diagrams 600, 700, and 800 are for illustration only and other embodiments can be used without departing from the scope of the present disclosure. Although FIG. 6 illustrates the diagram 600, FIG. 7 illustrates the diagram 700, and FIG. 8 illustrates the diagram 800 various changes may be made to FIGS. 6-8.

In certain embodiments, the downlink (DL) DCI, including the scheduling information of the multiple PDSCHs, includes an indication of a single TCI state (e.g. a codepoint of the DCI field 'Transmission Configuration Indication' corresponds to a single TCI state).

In one approach, the multiple PDSCHs scheduled by one DL DCI are allocated in a set of contiguous slots. An illustration is shown in 610 of FIG. 6.

In another approach, the multiple PDSCHs scheduled by one DL DCI are allocated in a set of non-contiguous slots, wherein there are at least two bursts of PDSCHs (wherein each burst of PDSCHs are in contiguous slots) within the multiple PDSCHs. An illustration is shown in 620 of FIG. 6.

For example of this embodiment, the time offset between the reception of the DL DCI and all the scheduled PDSCHs of a serving cell is equal to or greater than a threshold (timeDurationForQCL) (e.g. as shown in 710 of FIG. 7 for contiguous resource allocation or as shown in 810 of FIG. 8 for non-contiguous resource allocation), the UE assumes all the PDSCHs have the same TCI state, and the same TCI state is provided by the DL DCI, if the TCI state is determined to be present in the DL DCI, or the same TCI state or the QCL assumption for the PDSCHs is identical to the TCI state or QCL assumption whichever is applied for the CORESET used for the PDCCH transmission within the active bandwidth part (BWP) of the serving cell, if the TCI state is determined to be not present in the DL DCI. For instance, if the RRC parameter (e.g. tci-PresentInDCI set as 'enableId' and/or tci-PresentDCI-1-2 configured) indicates TCI state is present in DCI, the UE assumes the TCI state is present.

For another example of this approach, the time offset between the reception of the DL DCI and all the scheduled PDSCHs of a serving cell is smaller than a threshold (timeDurationForQCL) (e.g. as shown in 720 of FIG. 7 for contiguous resource allocation or as shown in 840 of FIG. 8 for non-contiguous resource allocation), the UE assumes all the scheduled PDSCHs have the same example for determining the TCI state or QCL assumption, wherein the same example is from one of the examples "TCI/QCL Example A", "TCI/QCL Example B", "TCI/QCL Example C", or "TCI/QCL Example D", as described in this disclosure.

For another example of this approach, the time offset between the reception of the DL DCI and a first part of the scheduled PDSCHs of a serving cell is smaller than a threshold (timeDurationForQCL), and the time offset between the reception of the DL DCI and a second part of the scheduled PDSCHs of a serving cell is equal to or larger than the threshold (timeDurationForQCL) (e.g. as shown in 730 of FIG. 7 for contiguous resource allocation or as shown in 820 or 830 of FIG. 8 for non-contiguous resource allocation), the UE assumes all the scheduled PDSCHs (both the first part and the second part) have the same example for determining the TCI state or QCL assumption, wherein the same example is from one of the examples "TCI/QCL Example A", "TCI/QCL Example B", "TCI/QCL Example C", or "TCI/QCL Example D", as described in this disclosure.

For yet another example of this approach, the time offset between the reception of the DL DCI and a first part of the scheduled PDSCHs of a serving cell is smaller than a threshold (timeDurationForQCL), and the time offset between the reception of the DL DCI and a second part of the scheduled PDSCHs of a serving cell is equal to or larger than the threshold (timeDurationForQCL) (e.g. as shown in 730 of FIG. 7 for contiguous resource allocation or as shown in 820 or 830 of FIG. 6 for non-contiguous resource allocation), the UE assumes the second part of the PDSCHs have the same TCI state provided by the DL DCI (e.g. if the TCI state is present in the DCI), and the first part of the PDSCHs have the same example for determining the TCI state or QCL assumption, wherein the same example is from one of the examples "TCI/QCL Example A", "TCI/QCL Example B", "TCI/QCL Example C", or "TCI/QCL Example D", as described in this disclosure.

For another example of this approach, the time offset between the reception of the DL DCI and a first part of the scheduled PDSCHs of a serving cell is smaller than a threshold (timeDurationForQCL), and the time offset between the reception of the DL DCI and a second part of the scheduled PDSCHs of a serving cell is equal to or larger than the threshold (timeDurationForQCL) (e.g. as shown in 730 of FIG. 7 for contiguous resource allocation or as shown in 820 or 830 of FIG. 8 for non-contiguous resource allocation), the UE determines the TCI state or QCL assumption for the first part and second part of the PDSCH separately. The UE assumes the second part of the PDSCHs have the same TCI state provided by the DL DCI, if the TCI state is present in the DCI; or the TCI state or the QCL assumption for the second part of the PDSCHs is identical to the TCI state or QCL assumption whichever is applied for the CORESET used for the PDCCH transmission within the active BWP of the serving cell, if the TCI state is not present in the DCI. For instance, if the RRC parameter (e.g. tci-PresentInDCI set as 'enableId' and/or tci-PresentDCI-1-2 configured) indicates TCI state is present in DCI, the UE assumes the TCI state is present. The UE assumes the first part of the PDSCHs have the same example for determining the TCI state or QCL assumption, wherein the same example is from one of the examples "TCI/QCL Example A", "TCI/QCL Example B", "TCI/QCL Example C", or "TCI/QCL Example D", as described in this disclosure.

For another example of this approach, the time offset between the reception of the DL DCI and a first part of the scheduled PDSCHs of a serving cell is smaller than a threshold (timeDurationForQCL), and the time offset between the reception of the DL DCI and a second part of the scheduled PDSCHs of a serving cell is equal to or larger than the threshold (timeDurationForQCL) (e.g. as shown in 730 of FIG. 7 for contiguous resource allocation or as shown in 820 or 830 of FIG. 8 for non-contiguous resource allocation), the UE determines the TCI state or QCL assumption for the scheduled PDSCHs based on the size of the time-domain gap between the two part of the PDSCHs (e.g. the gap between the end of the last symbol of the first part of PDSCHs and the start of the first symbol of the second part of the PDSCHs). If the time-domain gap is smaller than (or no larger than) a threshold, the UE assumes all the scheduled PDSCHs (both the first part and the second part) have the same example for determining the TCI state or QCL assumption, wherein the same example is from one of the examples "TCI/QCL Example A", "TCI/QCL Example B", "TCI/QCL Example C", or "TCI/QCL Example D", as described in this disclosure. If the time-domain gap is larger than (or no smaller than) the threshold, the UE determines the TCI state or QCL assumption separately for the first part and second part of the PDSCHs. In certain instances, the UE assumes the second part of the PDSCHs have the same TCI state provided by the DL DCI (e.g. if the TCI state is present in the DCI. In certain instances, the UE assumes the first part of the PDSCHs have the same example for determining the TCI state or QCL assumption, wherein the same example is from one of the examples "TCI/QCL Example A", "TCI/QCL Example B", "TCI/QCL Example C", or "TCI/QCL Example D", as described in this disclosure.

For another example of this approach, the time offset between the reception of the DL DCI and a first part of the scheduled PDSCHs of a serving cell is smaller than a threshold (timeDurationForQCL), and the time offset between the reception of the DL DCI and a second part of the scheduled PDSCHs of a serving cell is equal to or larger than the threshold (timeDurationForQCL) (e.g. as shown in 730 of FIG. 7 for contiguous resource allocation or as shown in 820 or 830 of FIG. 8 for non-contiguous resource allocation), the UE determines the TCI state or QCL assumption for the scheduled PDSCHs based on the size of the time-domain gap between the two part of the PDSCHs (e.g. the gap between the end of the last symbol of the first part of PDSCHs and the start of the first symbol of the second part of the PDSCHs). If the time-domain gap is smaller than (or no larger than) a threshold, the UE assumes all the scheduled PDSCHs (both the first part and the second part) have the same example for determining the TCI state or QCL assumption, wherein the same example is from one of the examples "TCI/QCL Example A", "TCI/QCL Example B", "TCI/QCL Example C", or "TCI/QCL Example D", as described in this disclosure. If the time-domain gap is larger than (or no smaller than) the threshold, the UE determines the TCI state or QCL assumption separately for the first part and second part of the PDSCHS. For instance, the UE assumes the second part of the PDSCHs have the same TCI state provided by the DL DCI, if the TCI state is present in the DCI; or the TCI state or the QCL assumption for the second part of the PDSCHs is identical to the TCI state or QCL assumption whichever is applied for the CORESET used for the PDCCH transmission within the active BWP of the serving cell, if the TCI state is not present in the DCI. For instance, if the RRC parameter (e.g. tci-PresentInDCI set as 'enableId' and/or tci-PresentDCI-1-2 configured) indicates TCI state is present in DCI, the UE assumes the TCI state is present. For another instance, the UE assumes the first part of the PDSCHs have the same example for determining the TCI state or QCL assumption, wherein the same example is from one of the examples "TCI/QCL Example A", "TCI/QCL Example B", "TCI/QCL Example C", or "TCI/QCL Example D", as described in this disclosure.

In one implementation of the threshold for the time-domain gap in the above examples, the threshold can be at least the beam switching duration. For instance, the threshold can be configured by the network. For another instance, the threshold can be a fixed time duration that can cover the beam switching duration (e.g. one OFDM symbol).

For yet another example of this approach, when the multiple PDSCHs scheduled by one DCI are allocated in a set of non-contiguous slots (e.g. multiple bursts of PDSCHs, as shown in 620 of FIG. 6, wherein the gap between neighboring burst is at least one symbol), the UE determines the TCI state or QCL assumption for each of the bursts of PDSCHs separately: for each burst of PDSCHs, If the time offset between the reception of the DL DCI and all PDSCHs in the burst of PDSCHs is equal to or larger than a threshold (timeDurationForQCL), the UE assumes all the PDSCHs in the burst of PDSCHs have the corresponding TCI state provided by the DL DCI, if the TCI state is determined to be present in the DL DCI, or the same TCI state or the QCL assumption for the PDSCH is identical to the TCI state or QCL assumption whichever is applied for the CORESET used for the PDCCH transmission within the active BWP of the serving cell, if the TCI state is determined to be not present in the DL DCI. For instance, if the RRC parameter (e.g. tci-PresentInDCI set as 'enableId' and/or tci-PresentDCI-1-2 configured) indicates TCI state is present in DCI, the UE assumes the TCI state is present. If the time offset between the reception of the DL DCI and any PDSCH in the burst of PDSCHs is smaller than a threshold (timeDurationForQCL), the UE assumes all the PDSCHs in the burst of PDSCHs have the same example for determining the TCI state or QCL assumption, wherein the same example is from one of the examples "TCI/QCL Example A", "TCI/QCL Example B", "TCI/QCL Example C", "TCI/QCL Example D", "TCI/QCL Example G", or "TCI/QCL Example H", as described in this disclosure.

Embodiments of the present disclosure also describe multiple TCI indicators in DCI. This is described in the following examples and embodiments, such as those of FIGS. 9 and 10.

Figure 9:
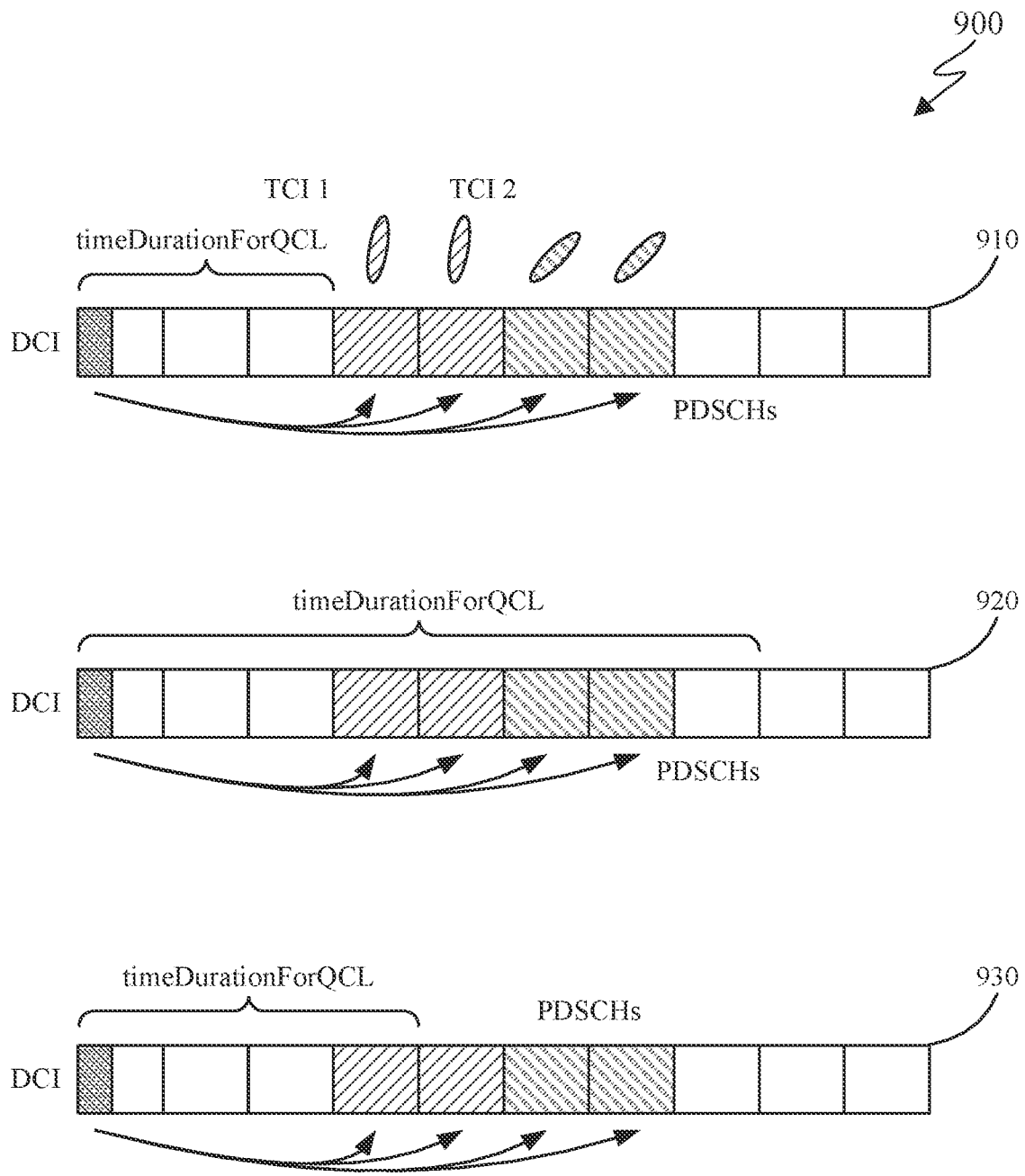
FIG. 9 illustrates an example diagram of example PDSCHs scheduled by one DCI with respect to a threshold timing according to embodiments of the present disclosure.
Figure 10:
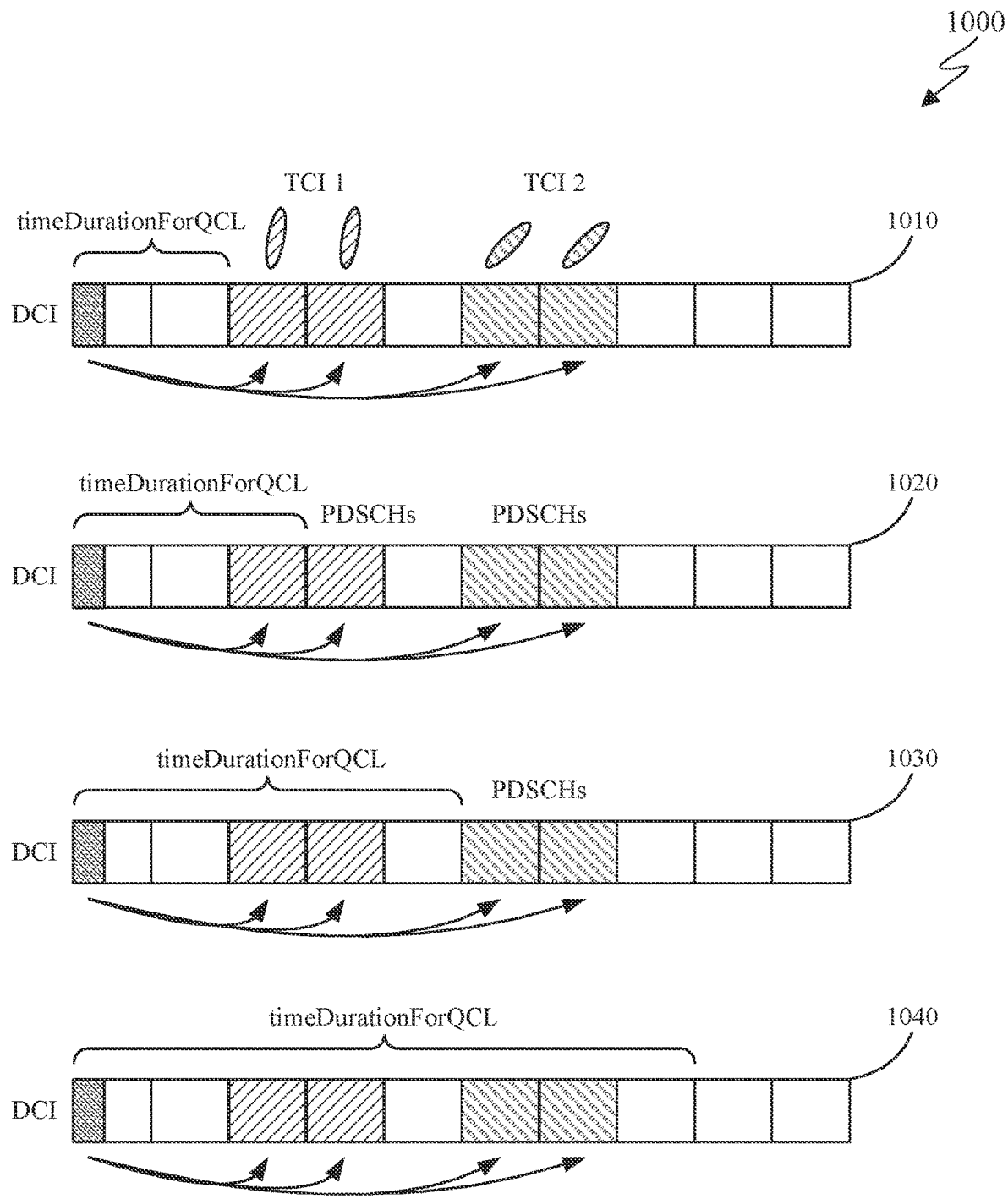
FIG. 10 illustrates an example diagram of example PDSCHs scheduled by one DCI with respect to a threshold timing according to embodiments of the present disclosure.

FIG. 9 illustrates an example diagram 900 of example PDSCHs scheduled by one DCI with respect to a threshold timing according to embodiments of the present disclosure. FIG. 10 illustrates an example diagram 1000 of example PDSCHs scheduled by one DCI with respect to a threshold timing according to embodiments of the present disclosure.

The diagrams 900 and 1000 are for illustration only and other embodiments can be used without departing from the scope of the present disclosure. Although FIG. 9 illustrates the diagram 900 and FIG. 10 illustrates the diagram 1000 various changes may be made to FIGS. 9 and 10.

In certain embodiments, the DL DCI, including the scheduling information of the multiple PDSCHs, includes an indication of multiple TCI states. In this disclosure, without loss of generality, two TCI states are assumed to be indicated in the DL DCI, and the approach and example of this disclosure can be generalized to more than two TCI states.

In certain embodiments, a UE (such as the UE 116) can be configured with a single timing threshold (timeDurationForQCL) in higher layer parameters, wherein the single timing threshold is applicable for all the TCI states (e.g. two TCI states) indicated in the DL DCI.

In one approach, the multiple PDSCHs scheduled by one DL DCI are allocated in a set of contiguous slots. An illustration is shown in 610 of FIG. 6.

In another approach, the multiple PDSCHs scheduled by one DL DCI are allocated in a set of non-contiguous slots, wherein there are at least two bursts of PDSCHs (wherein each burst of PDSCHs are in contiguous slots) within the multiple PDSCHs. An illustration is shown in 620 of FIG. 6.

For example, the time offset between the reception of the DL DCI and all the scheduled PDSCHs of a serving cell is equal to or greater than a threshold (timeDurationForQCL) (e.g. as shown in 910 of FIG. 9 for contiguous resource allocation or as shown in 1010 of FIG. 10 for non-contiguous resource allocation), the UE assumes each of the PDSCHs has the corresponding TCI state provided by the DL DCI (e.g. one of the two TCI states indicated by the DL DCI), if the corresponding TCI state is determined to be present in the DL DCI, or the same TCI state or the QCL assumption for the PDSCHs is identical to the TCI state or QCL assumption whichever is applied for the CORESET used for the PDCCH transmission within the active BWP of the serving cell, if the corresponding TCI state is determined to be not present in the DL DCI. For instance, if the RRC parameter (e.g. tci-PresentInDCI set as 'enableId' and/or tci-PresentDCI-1-2 configured) indicates TCI state is present in DCI, the UE assumes the TCI state is present.

For another example, the time offset between the reception of the DL DCI and all the scheduled PDSCHs of a serving cell is smaller than a threshold (timeDurationForQCL) (e.g. as shown in 920 of FIG. 9 for contiguous resource allocation or as shown in 1040 of FIG. 10 for non-contiguous resource allocation), the UE assumes all the PDSCHs have the same example for determining the TCI state or QCL assumption, wherein the same example is from one of the examples "TCI/QCL Example A", "TCI/QCL Example B", "TCI/QCL Example C", or "TCI/QCL Example D", as described in this disclosure.

For another example, the time offset between the reception of the DL DCI and a first part of the scheduled PDSCHs of a serving cell is smaller than a threshold (timeDurationForQCL), and the time offset between the reception of the DL DCI and a second part of the scheduled PDSCHs of a serving cell is equal to or larger than the threshold (timeDurationForQCL) (e.g. as shown in 930 of FIG. 9 for contiguous resource allocation or as shown in 1020 or 1030 of FIG. 10 for non-contiguous resource allocation), the UE assumes all the PDSCHs have the same example for determining the TCI state or QCL assumption, wherein the same example is from one of the examples "TCI/QCL Example A", "TCI/QCL Example B", "TCI/QCL Example C", or "TCI/QCL Example D", as described in this disclosure.

For another example, the time offset between the reception of the DL DCI and a first part of the scheduled PDSCHs of a serving cell is smaller than a threshold (timeDurationForQCL), and the time offset between the reception of the DL DCI and a second part of the scheduled PDSCHs of a serving cell is equal to or larger than the threshold (timeDurationForQCL) (e.g. as shown in 930 of FIG. 9 for contiguous resource allocation or as shown in 1020 or 1030 of FIG. 10 for non-contiguous resource allocation), the UE assumes each PDSCH in the second part of the PDSCHs has the corresponding TCI state provided by the DL DCI (e.g. one of the two TCI states indicated by the DL DCI), and the first part of the PDSCHs have the same example for determining the TCI state or QCL assumption, wherein the same example is from one of the examples "TCI/QCL Example A", "TCI/QCL Example B", "TCI/QCL Example C", or "TCI/QCL Example D", as described in this disclosure.

For another example, the time offset between the reception of the DL DCI and a first part of the scheduled PDSCHs of a serving cell is smaller than a threshold (timeDurationForQCL), and the time offset between the reception of the DL DCI and a second part of the scheduled PDSCHs of a serving cell is equal to or larger than the threshold (timeDurationForQCL) (e.g. as shown in 930 of FIG. 9 for contiguous resource allocation or as shown in 1020 or 1030 of FIG. 10 for non-contiguous resource allocation), the UE determines the TCI state or QCL assumption for the first part and second part of the PDSCH separately. The UE assumes each PDSCH in the second part of the PDSCHs has the corresponding TCI state provided by the DL DCI (e.g. one of the two TCI states indicated by the DL DCI), if the corresponding TCI state is present in the DCI; or the TCI state or the QCL assumption for the second part of the PDSCHs is identical to the TCI state or QCL assumption whichever is applied for the CORESET used for the PDCCH transmission within the active BWP of the serving cell, if the corresponding TCI state is not present in the DCI. For instance, if the RRC parameter (e.g. tci-PresentInDCI set as 'enableId' and/or tci-PresentDCI-1-2 configured) indicates TCI state is present in DCI, the UE assumes the TCI state is present. The UE assumes the first part of the PDSCHs have the same example for determining the TCI state or QCL assumption, wherein the same example is from one of the examples "TCI/QCL Example A", "TCI/QCL Example B", "TCI/QCL Example C", or "TCI/QCL Example D", as described in this disclosure.

For another example of this approach, the time offset between the reception of the DL DCI and a first part of the scheduled PDSCHs of a serving cell is smaller than a threshold (timeDurationForQCL), and the time offset between the reception of the DL DCI and a second part of the scheduled PDSCHs of a serving cell is equal to or larger than the threshold (timeDurationForQCL) (e.g. as shown in 930 of FIG. 9 for contiguous resource allocation or as shown in 1020 or 1030 of FIG. 10 for non-contiguous resource allocation), the UE determines the TCI state or QCL assumption for the scheduled PDSCHs based on the size of the time-domain gap between the two part of the PDSCHs (e.g. the gap between the end of the last symbol of the first part of PDSCHs and the start of the first symbol of the second part of the PDSCHs). If the time-domain gap is smaller than (or no larger than) a threshold, the UE assumes all the scheduled PDSCHs (both the first part and the second part) have the same example for determining the TCI state or QCL assumption, wherein the same example is from one of the examples "TCI/QCL Example A", "TCI/QCL Example B", "TCI/QCL Example C", or "TCI/QCL Example D", as described in this disclosure. If the time-domain gap is larger than (or no smaller than) the threshold, the UE determines the TCI state or QCL assumption separately for the first part and second part of the PDSCHS. The UE assumes each PDSCH in the second part of the PDSCHs has the corresponding TCI state provided by the DL DCI (e.g. one of the two TCI states indicated by the DL DCI), if the corresponding TCI state is present in the DCI; or the TCI state or the QCL assumption for the second part of the PDSCHs is identical to the TCI state or QCL assumption whichever is applied for the CORESET used for the PDCCH transmission within the active BWP of the serving cell, if the corresponding TCI state is not present in the DCI. For instance, if the RRC parameter (e.g. tci-PresentInDCI set as 'enableId' and/or tci-PresentDCI-1-2 configured) indicates TCI state is present in DCI, the UE assumes the TCI state is present. The UE assumes the first part of the PDSCHs have the same example for determining the TCI state or QCL assumption, wherein the same example is from one of the examples "TCI/QCL Example A", "TCI/QCL Example B", "TCI/QCL Example C", or "TCI/QCL Example D", as described in this disclosure.

For another example of this approach, the UE determines the TCI state or QCL assumption for each group of PDSCHs with the same indicated TCI state separately: for each group of PDSCHs with the same indicated TCI state. If the time offset between the reception of the DL DCI and all PDSCHs in the group of PDSCHs with the same indicated TCI state is equal to or larger than a threshold (timeDurationForQCL), the UE assumes all the PDSCHs in the group of PDSCHs have the corresponding TCI state provided by the DL DCI (e.g. one of the two TCI states indicated by the DL DCI). If the time offset between the reception of the DL DCI and any PDSCH in the group of PDSCHs with the same indicated TCI state is smaller than a threshold (timeDurationForQCL), the UE assumes all PDSCHs in the group of PDSCHs with the same indicated TCI state have the same example for determining the TCI state or QCL assumption, wherein the same example is from one of the examples "TCI/QCL Example A", "TCI/QCL Example B", "TCI/QCL Example E", or "TCI/QCL Example F", as described in this disclosure.

For another example of this approach, the UE determines the TCI state or QCL assumption for each group of PDSCHs with the same indicated TCI state separately: for each group of PDSCHs with the same indicated TCI state, one of the example for single TCI state can be applied to the group of PDSCHs, as described in the disclosure, wherein the TCI state in the DCI is the corresponding TCI state for the group of PDSCHs.

For another example of this approach, the UE determines the TCI state or QCL assumption for each group of PDSCHs with the same indicated TCI state separately: for each group of PDSCHs with the same indicated TCI state. If the time offset between the reception of the DL DCI and any PDSCH in the group of PDSCHs with the same indicated TCI state is equal to or larger than a threshold (timeDurationForQCL), the UE assumes that PDSCH in the group of PDSCHs has the corresponding TCI state provided by the DL DCI (e.g. one of the two TCI states indicated by the DL DCI). If the time offset between the reception of the DL DCI and any PDSCH of the group of PDSCHs with the same indicated TCI state is smaller than a threshold (timeDurationForQCL), the UE assumes that PDSCH in the group of PDSCHs has the same example for determining the TCI state or QCL assumption, wherein the same example is from one of the examples "TCI/QCL Example A", "TCI/QCL Example B", "TCI/QCL Example E", or "TCI/QCL Example F", as described in this disclosure.

For another example of this approach, when the multiple PDSCHs scheduled by one DCI are allocated in a set of non-contiguous slots (e.g. multiple bursts of PDSCHs, as shown in 620 of FIG. 6), the UE determines the TCI state or QCL assumption for each burst of PDSCHs with the same indicated TCI state separately: for each burst of PDSCHs with the same indicated TCI state. If the time offset between the reception of the DL DCI and all PDSCHs in the burst of PDSCHs with the same indicated TCI state is equal to or larger than a threshold (timeDurationForQCL), the UE assumes all the PDSCHs in the burst of PDSCHs have the corresponding TCI state provided by the DL DCI (e.g. one of the two TCI states indicated by the DL DCI). If the time offset between the reception of the DL DCI and any PDSCH in the burst of PDSCHs with the same indicated TCI state is smaller than a threshold (timeDurationForQCL), the UE assumes all PDSCHs in the burst of PDSCHs with the same indicated TCI state have the same example for determining the TCI state or QCL assumption, wherein the same example is from one of the examples "TCI/QCL Example A", "TCI/QCL Example B", "TCI/QCL Example G", or "TCI/QCL Example H", as described in this disclosure.

For yet another example of this approach, when the multiple PDSCHs scheduled by one DCI are allocated in a set of non-contiguous slots (e.g. multiple bursts of PDSCHs, as shown in 620 of FIG. 6), the UE determines the TCI state or QCL assumption for each burst of PDSCHs with the same indicated TCI state separately: for each burst of PDSCHs with the same indicated TCI state. If the time offset between the reception of the DL DCI and any PDSCH in the burst of PDSCHs with the same indicated TCI state is equal to or larger than a threshold (timeDurationForQCL), the UE assumes that PDSCH in the burst of PDSCHs has the corresponding TCI state provided by the DL DCI (e.g. one of the two TCI states indicated by the DL DCI). If the time offset between the reception of the DL DCI and any PDSCH of the burst of PDSCHs with the same indicated TCI state is smaller than a threshold (timeDurationForQCL), the UE assumes that PDSCH in the burst of PDSCHs has the TCI state or QCL assumption from one of the examples "TCI/QCL Example A", "TCI/QCL Example B", "TCI/QCL Example G", or "TCI/QCL Example H", as described in this disclosure.

In certain embodiments, a UE (such as the UE 116) can be configured with multiple timing thresholds in higher layer parameters, wherein the multiple timing thresholds are applicable for the multiple TCI states (e.g. two TCI states) indicated in the DL DCI. For instance, for each of the TCI state (e.g. i-th TCI state) indicated in the DL DCI, there is one associated timing threshold (e.g. timeDurationForQCL-i).

For example, if the time offset between the reception of the DL DCI and all PDSCHs in the group of PDSCHs with the same indicated TCI state (e.g. i-th TCI state) is equal to or larger than the corresponding threshold (e.g. timeDurationForQCL-i), the UE assumes the PDSCH in the group of PDSCHs has the corresponding TCI state (e.g. i-th TCI state) provided by the DL DCI.

For another example, if the time offset between the reception of the DL DCI and any PDSCH in the group of PDSCHs with the same indicated TCI state (e.g. i-th TCI state) is smaller than the corresponding threshold (e.g. timeDurationForQCL-i), the UE assumes all the scheduled PDSCHs have the same example for determining the TCI state or QCL assumption, wherein the same example is from one of the examples "TCI/QCL Example A", "TCI/QCL Example B", "TCI/QCL Example C", or "TCI/QCL Example D", as described in this disclosure.

For another example, the UE determines the TCI state or QCL assumption for each group of PDSCHs with the same indicated TCI state separately: for each group of PDSCHs with the same indicated TCI state (e.g. i-th TCI state). If the time offset between the reception of the DL DCI and all PDSCHs in the group of PDSCHs with the same indicated TCI state (e.g. i-th TCI state) is equal to or larger than a threshold (timeDurationForQCL-i), the UE assumes all the PDSCHs in the group of PDSCHs have the corresponding TCI state provided by the DL DCI. If the time offset between the reception of the DL DCI and any PDSCH in the group of PDSCHs with the same indicated TCI state (e.g. i-th TCI state) is smaller than a threshold (timeDurationForQCL-i), the UE assumes all the PDSCHs in the group of PDSCHs with the same indicated TCI state have the same example for determining the TCI state or QCL assumption, wherein the same example is from one of the examples "TCI/QCL Example A", "TCI/QCL Example B", "TCI/QCL Example E", or "TCI/QCL Example F", as described in this disclosure.

For another example, the UE determines the TCI state or QCL assumption for each group of PDSCHs with the same indicated TCI state separately: for each group of PDSCHs with the same indicated TCI state (e.g. i-th TCI state). If the time offset between the reception of the DL DCI and any PDSCH in the group of PDSCHs with the same indicated TCI state (e.g. i-th TCI state) is equal to or larger than a threshold (timeDurationForQCL-i), the UE assumes that PDSCH has the corresponding TCI state provided by the DL DCI. If the time offset between the reception of the DL DCI and any PDSCH in the group of PDSCHs with the same indicated TCI state (e.g. i-th TCI state) is smaller than a threshold (timeDurationForQCL-i), the UE assumes that PDSCH has the TCI state or QCL assumption from one of the examples "TCI/QCL Example A", "TCI/QCL Example B", "TCI/QCL Example E", or "TCI/QCL Example F", as described in this disclosure.

For another example, the UE determines the TCI state or QCL assumption for each group of PDSCHs with the same indicated TCI state separately: for each group of PDSCHs with the same indicated TCI state (e.g. i-th TCI state), one of the example for single TCI state can be applied to the group of PDSCHs, as described in the disclosure, wherein the TCI state in the DCI is the corresponding TCI state for the group of PDSCHs (e.g. i-th TCI state), and the threshold is the corresponding threshold for the group of PDSCHs (e.g. timeDurationForQCL-i).

For another example, when the multiple PDSCHs scheduled by one DCI are allocated in a set of non-contiguous slots (e.g. multiple bursts of PDSCHs, as shown in 620 of FIG. 6), the UE determines the TCI state or QCL assumption for each burst of PDSCHs with the same indicated TCI state separately: for each burst of PDSCHs with the same indicated TCI state (e.g. i-th TCI state). If the time offset between the reception of the DL DCI and all PDSCHs in a PDSCH burst within the group of PDSCHs with the same indicated TCI state (e.g. i-th TCI state) is equal to or larger than a threshold (timeDurationForQCL-i), the UE assumes all PDSCHs in that PDSCH burst has the corresponding TCI state provided by the DL DCI. If the time offset between the reception of the DL DCI and any PDSCH in a PDSCH burst within the group of PDSCHs with the same indicated TCI state (e.g. i-th TCI state) is smaller than a threshold (timeDurationForQCL-i), the UE assumes all PDSCH in that PDSCH burst have the same example for determining the TCI state or QCL assumption, wherein the same example is from one of the examples "TCI/QCL Example A", "TCI/QCL Example B", "TCI/QCL Example G", or "TCI/QCL Example H", as described in this disclosure.

For yet another example of this sub-embodiment, when the multiple PDSCHs scheduled by one DCI are allocated in a set of non-contiguous slots (e.g. multiple bursts of PDSCHs, as shown in 620 of FIG. 6), the UE determines the TCI state or QCL assumption for each burst of PDSCHs with the same indicated TCI state separately: for each burst of PDSCHs with the same indicated TCI state (e.g. i-th TCI state). If the time offset between the reception of the DL DCI and any PDSCH in a PDSCH burst within the group of PDSCHs with the same indicated TCI state (e.g. i-th TCI state) is equal to or larger than a threshold (timeDurationForQCL-i), the UE assumes that PDSCH in the PDSCH burst has the corresponding TCI state provided by the DL DCI. If the time offset between the reception of the DL DCI and any PDSCH in a PDSCH burst within the group of PDSCHs with the same indicated TCI state (e.g. i-th TCI state) is smaller than a threshold (timeDurationForQCL-i), the UE assumes that PDSCH in the PDSCH burst has the TCI state or QCL assumption from one of the examples "TCI/QCL Example A", "TCI/QCL Example B", "TCI/QCL Example G", or "TCI/QCL Example H", as described in this disclosure.

Embodiments of the present disclosure further describe single TCI state or QCL assumption determinations. This is described in the following examples and embodiments, such as those of FIGS. 11A and 11B.

Figure 11A:
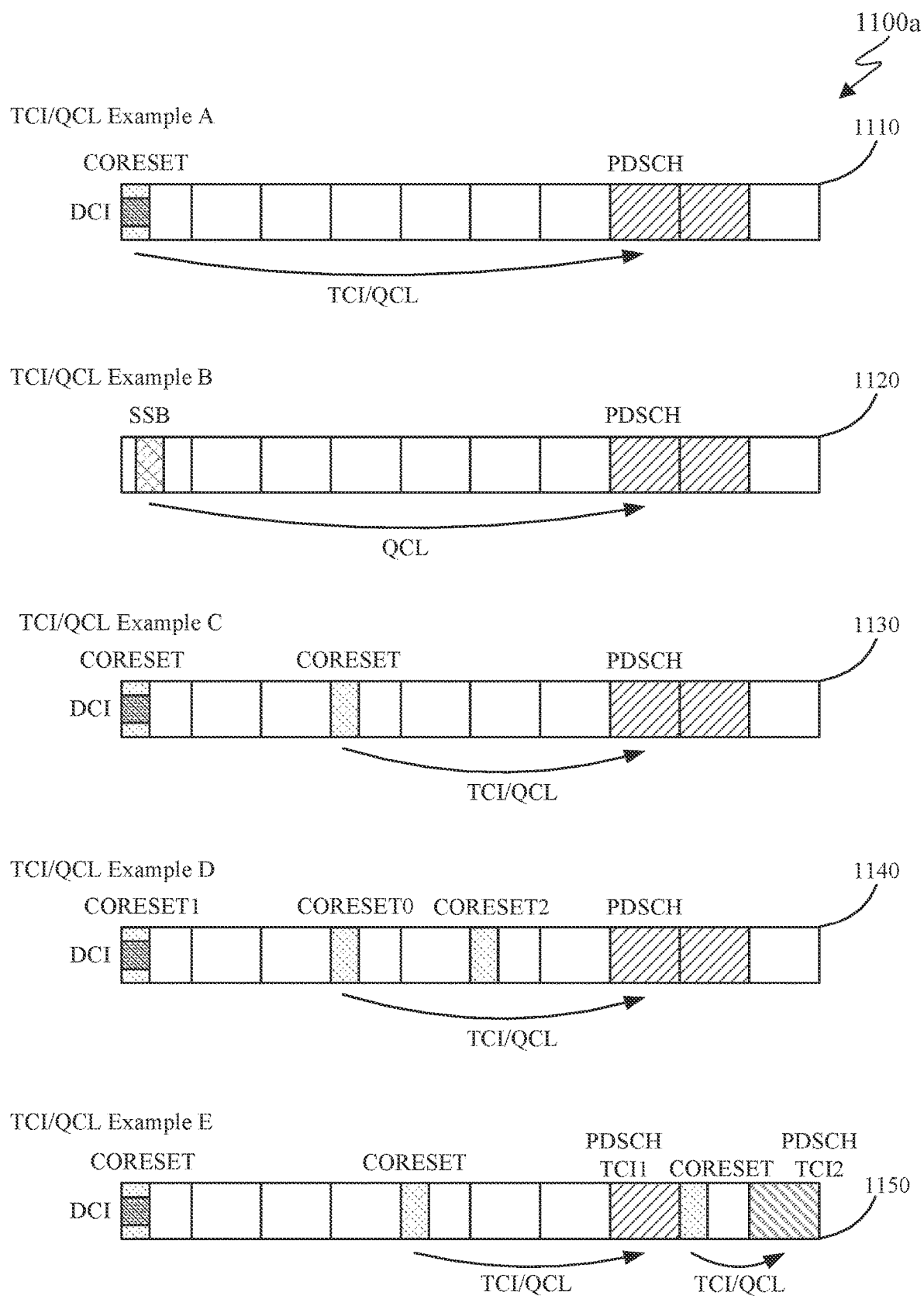
FIGS. 11A and 11B illustrates example diagrams of example transmission configuration indicator (TCI) states or QCL assumption determinations according to embodiments of the present disclosure.
Figure 11B:
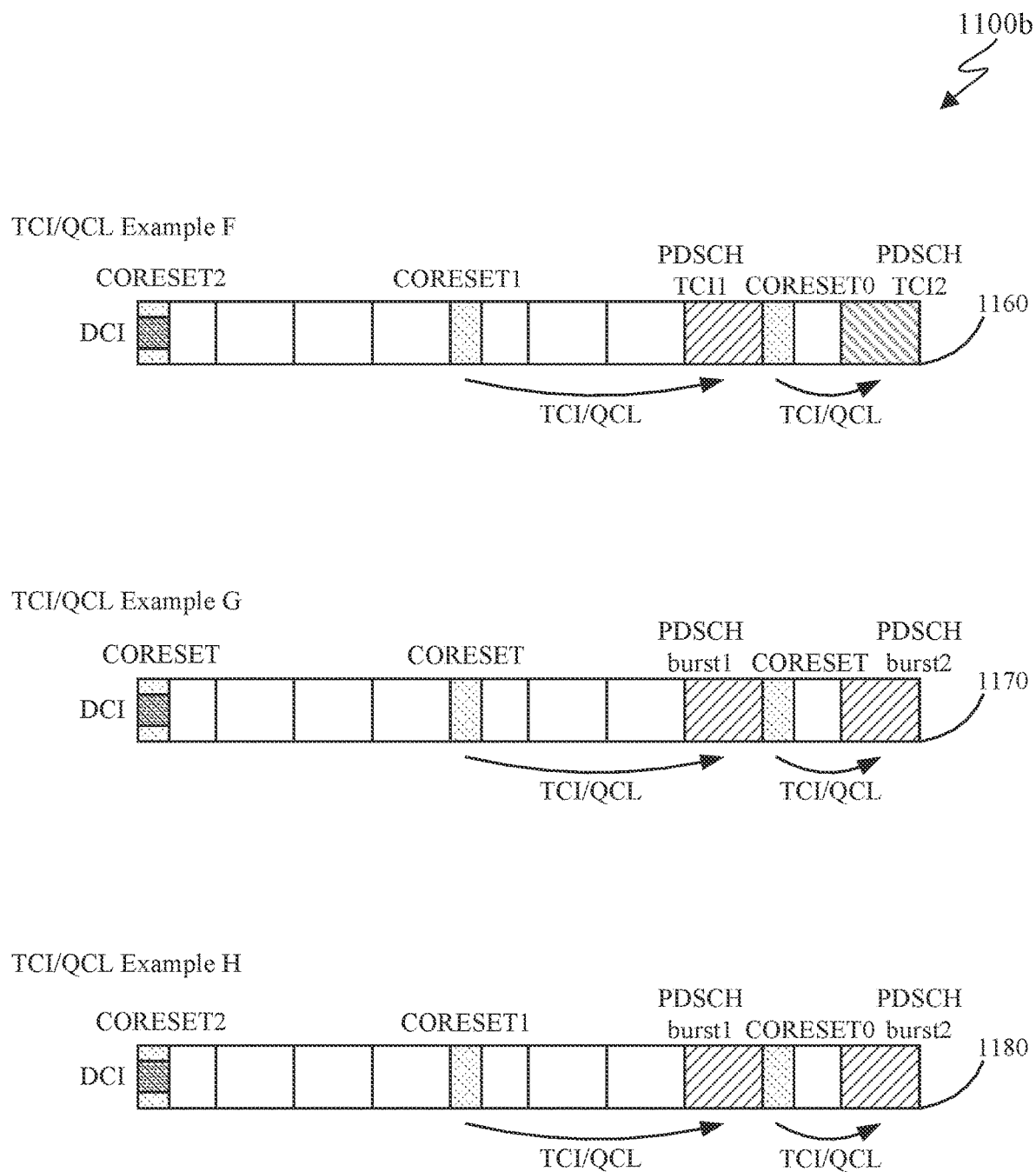

FIGS. 11A and 11B illustrates example diagrams 1100a and 1100b, respectively, of example TCI states or QCL assumption determinations according to embodiments of the present disclosure.

The diagrams 1100a and 1100b are for illustration only and other embodiments can be used without departing from the scope of the present disclosure. Although FIG. 11A illustrates the diagram 1100a and FIG. 11B illustrates the diagram 1100b various changes may be made to FIGS. 11A and 11B.

In certain embodiments, at least one of the following examples for determining a TCI state or QCL assumption can be supported.

In one example (denoted as "TCI/QCL Example A"), the TCI state or QCL assumption for all the PDSCHs is the same as the TCI state or QCL assumption for the CORESET used for the PDCCH transmission within the active BWP of the serving cell, wherein the PDCCH includes the DL DCI. An illustration of this example is shown in 1110 of FIG. 11A. For instance, this example can be applicable when TCI state is not present in the DL DCI.

For another example (denoted as "TCI/QCL Example B"), the dedicated demodulation (DM) reference signal (RS) ports of all the PDSCHs are assumed to be QCLed with the SS/PBCH block determined in the initial access procedure. An illustration of this example is shown in 1120 of FIG. 11A. For instance, this example can be applicable when a UE receives an initial higher layer configuration of TCI states and before reception of the activation command.

For another example (denoted as "TCI/QCL Example C"), the DM-RS ports of all the PDSCHs are assumed to be QCLed with the RS(s) for PDCCH QCL indication of the CORESET associated with a monitored search space with lowest ID (controlResourceSetId) in the latest slot with respect to a PDSCH of the multiple PDSCHs (e.g. the first PDSCH of the multiple PDSCHs), in which one or more CORESETs within the active BWP of the serving cell are monitored by the UE. An illustration of this example is shown in 1130 of FIG. 11A.

In yet another example (denoted as "TCI/QCL Example D"), the DM-RS ports of all the PDSCHs are assumed to be QCLed with the RS(s) for PDCCH QCL indication of the CORESET associated with a monitored search space with lowest ID (controlResourceSetId) in a set of slots, wherein a slot in the set is between the slot including the DL DCI and the slot before the first PDSCH of the multiple PDSCHs, and has one or more CORESETs within the active BWP of the serving cell to be monitored by the UE. An illustration of this example is shown in 1140 of FIG. 11A.

For another example (denoted as "TCI/QCL Example E"), the DM-RS ports of the PDSCHs with the same indicated TCI state are assumed to be QCLed with the RS(s) for PDCCH QCL indication of the CORESET associated with a monitored search space with lowest ID (controlResourceSetId) in the latest slot with respect to the first PDSCH of the multiple PDSCHs with the same indicated TCI state, in which one or more CORESETs within the active BWP of the serving cell are monitored by the UE. An illustration of this example is shown in 1150 of FIG. 11A.

For another example (denoted as "TCI/QCL Example F"), the DM-RS ports of the PDSCHs with the same indicated TCI state are assumed to be QCLed with the RS(s) for PDCCH QCL indication of the CORESET associated with a monitored search space with lowest ID (controlResourceSetId) in a set of slots, wherein a slot in the set is between the slot including the DL DCI and the slot before the first PDSCH of the multiple PDSCHs with the same indicated TCI state, and has one or more CORESETs within the active BWP of the serving cell to be monitored by the UE. An illustration of this example is shown in 1160 of FIG. 11B.

For another example (denoted as "TCI/QCL Example G"), the DM-RS ports of the PDSCHs with the same indicated TCI state are assumed to be QCLed with the RS(s) for PDCCH QCL indication of the CORESET associated with a monitored search space with lowest ID (controlResourceSetId) in the latest slot with respect to the first PDSCH of the burst of PDSCHs within the multiple PDSCHs with the same indicated TCI state, in which one or more CORESETs within the active BWP of the serving cell are monitored by the UE. An illustration of this example is shown in 1170 of FIG. 11B.

For yet another example (denoted as "TCI/QCL Example H"), the DM-RS ports of the PDSCHs with the same indicated TCI state are assumed to be QCLed with the RS(s) for PDCCH QCL indication of the CORESET associated with a monitored search space with lowest ID (controlResourceSetId) in a set of slots, wherein a slot in the set is between the slot including the DL DCI and the slot before the first PDSCH of the burst of PDSCHs within the multiple PDSCHs with the same indicated TCI state, and has one or more CORESETs within the active BWP of the serving cell to be monitored by the UE. An illustration of this example is shown in 1180 of FIG. 11B.

Additionally, embodiments of the present disclosure describe enhancements to DM-RS for PDSCH. This is described in the following examples and embodiments, such as those of FIGS. 12-16.

Figure 12:
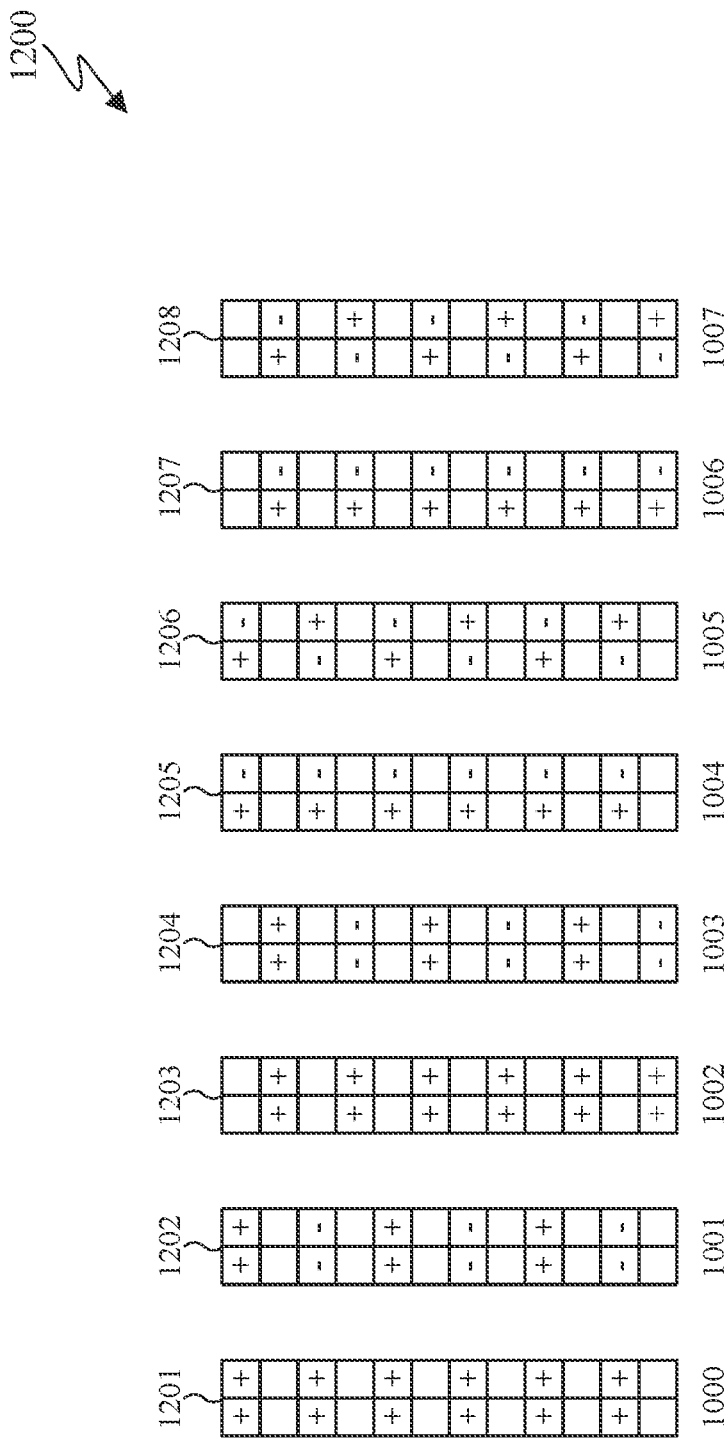
FIG. 12 illustrates an example diagram of a Type-1 dedicated demodulation (DM) reference signal (RS) configuration according to embodiments of the present disclosure.
Figure 13:
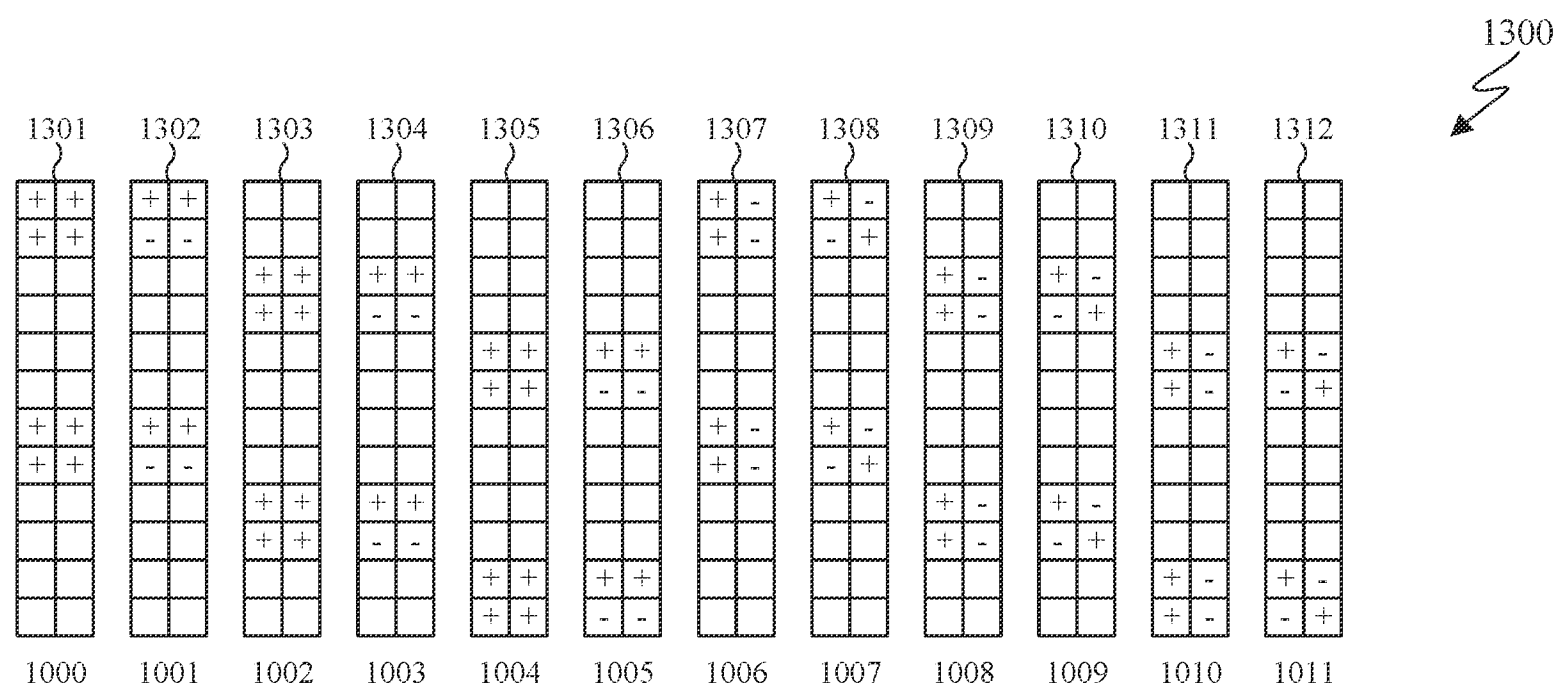
Figure 14:
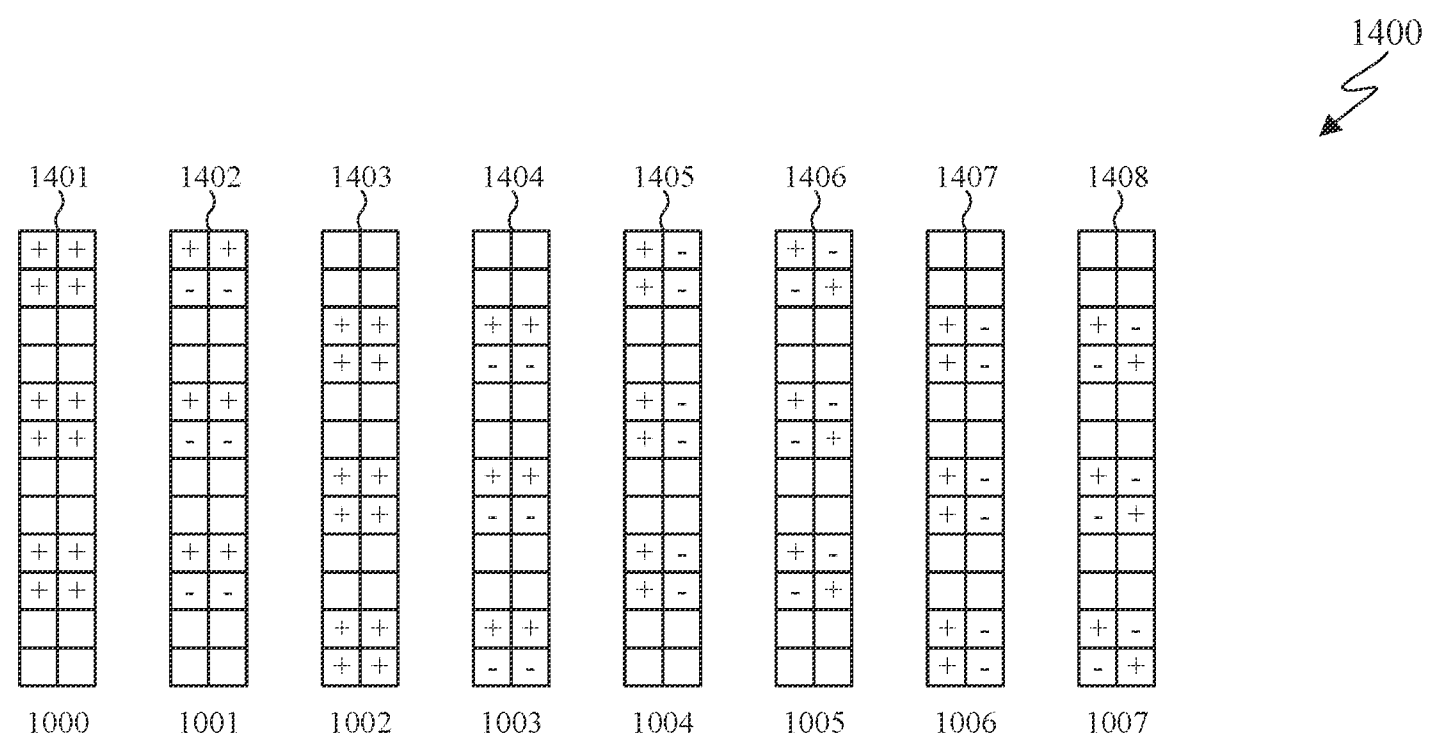
Figure 15:
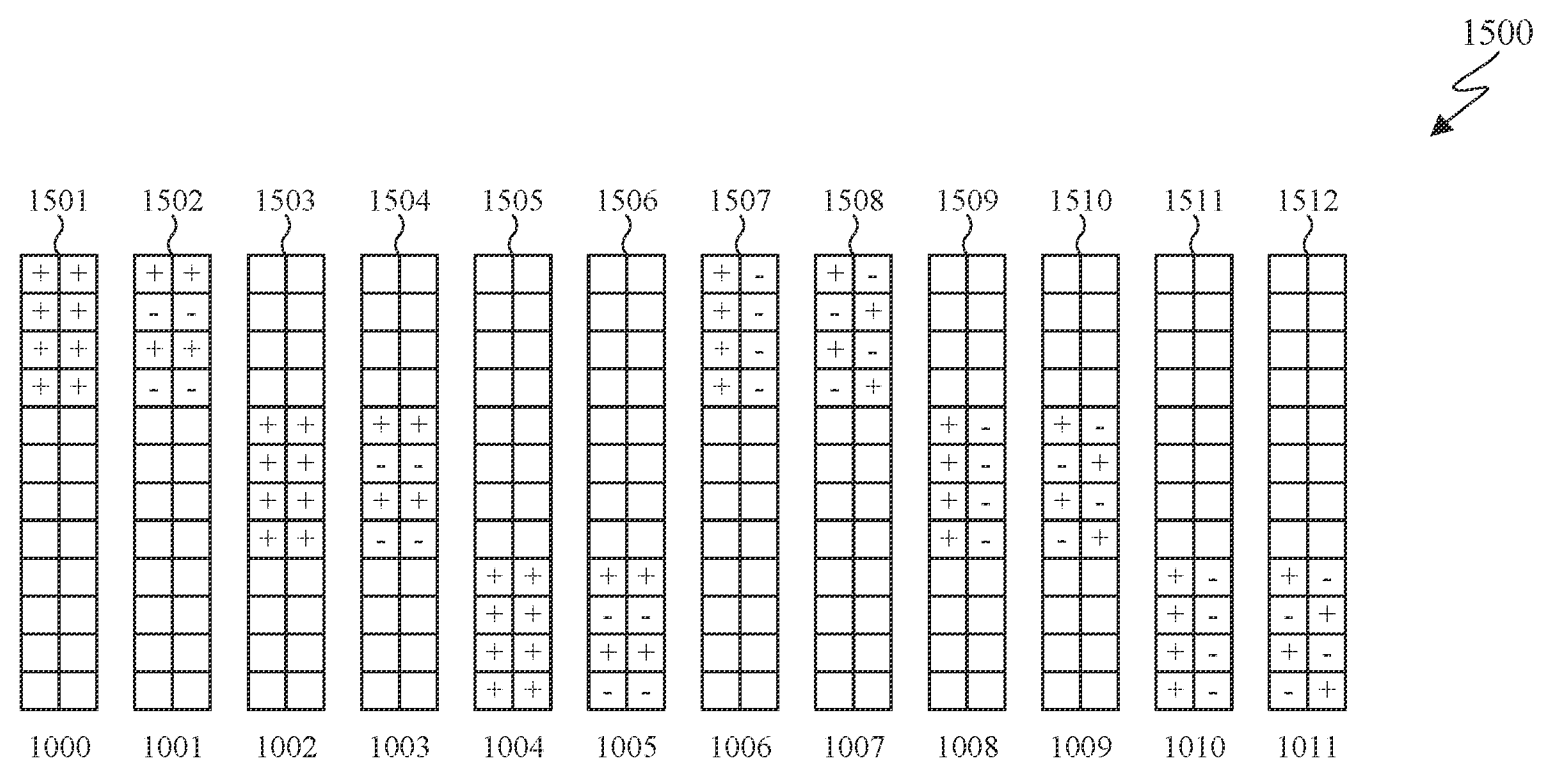
Figure 16:
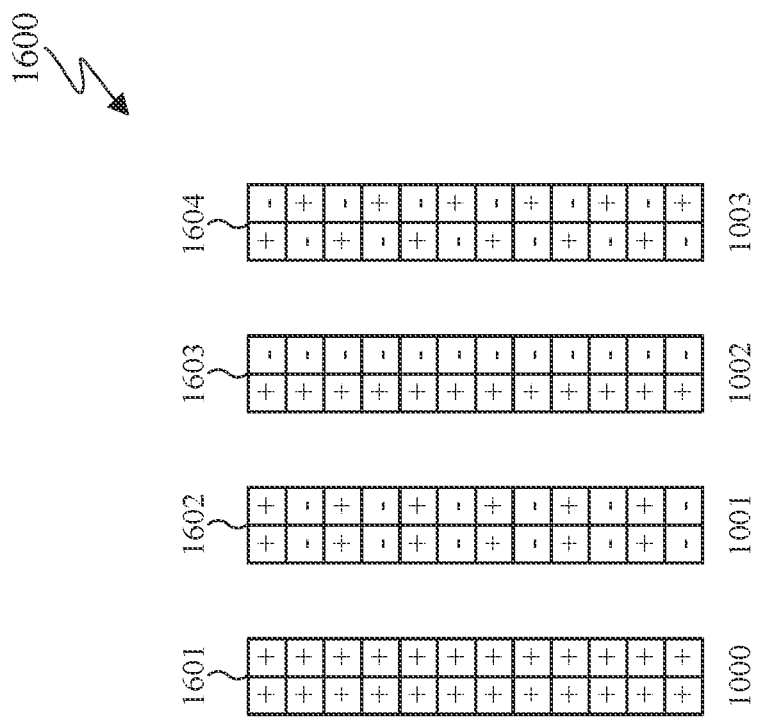

FIG. 12 illustrates an example diagram 1200 of a Type-1 dedicated demodulation (DM) reference signal (RS) configuration according to embodiments of the present disclosure. FIG. 13 illustrates an example diagram 1300 of a Type-2 DM-RS configuration according to embodiments of the present disclosure. FIG. 14-16 illustrate example diagrams 1400, 1500, and 1600, respectively, of a DM-RS configuration according to embodiments of the present disclosure.

The diagrams 1200, 1300, 1400, 1500, and 1600 are for illustration only and other embodiments can be used without departing from the scope of the present disclosure. Although FIG. 12 illustrates the diagram 1200, FIG. 13 illustrates the diagram 1300, FIG. 14 illustrates the diagram 1400, FIG. 15 illustrates the diagram 1500, and FIG. 16 illustrates the diagram 1600 various changes may be made to FIGS. 12-16.

Embodiments of the present disclosure take into consideration that in NR Rel-15 and Rel-16, two types of DM-RS configurations for PDSCH were supported. In Type-1 DM-RS configuration, as illustrated in FIG. 12, 6 REs with uniform interval within an resource block (RB) are mapped for DM-RS sequence, which is further applied with length-2 frequency domain orthogonal cover code (FD-OCC) and length-2 time domain orthogonal cover code (TD-OCC). The example of port 1000 to 1007 for Type-1 DM-RS configuration is shown in 1201-1208 of FIG. 12, respectively. In Type-2 DM-RS configuration, as illustrated in FIG. 13, 4 REs with every two in a group within an RB are mapped for DM-RS sequence, which is further applied with length-2 FD-OCC and length-2 TD-OCC. The example of port 1000 to 1011 for Type-2 DM-RS configuration is shown in 1301 to 1312 of FIG. 13, respectively.

For higher frequency range, when a higher subcarrier spacing is used, embodiments of the present disclosure take into consideration that there is a need to enhance the DM-RS. Both Type-1 and Type-2 DM-RS configurations utilize FD-OCC over non-consecutive REs in the frequency domain, which requires an assumption of same or similar channel condition for those two REs for FD-OCC to work properly. The enhancement to the DM-RS can include a new configuration in frequency domain, or a mechanism to turn off the FD-OCC.

Accordingly, embodiments of the present disclosure describe the FD-OCC enhancement for DM-RS of PDSCH. For example, embodiments of the present disclosure describe DM-RS pattern, in addition to the ones supported in Rel-15 and Rel-16. Embodiments of the present disclosure also describe UE assumption on the FD-OCC including (i) fixed rule, (ii) RRC configuration, and (iii) DCI indication.

In certain embodiments, a DM-RS pattern can be supported. Here, FD-OCC is applied to consecutive REs within an RB.

For one example DM-RS configuration, as illustrated in FIG. 14, six REs within an RB are mapped for DM-RS sequence. Here, two consecutive REs are further applied with length-2 frequency domain orthogonal cover code (FD-OCC), and a length-2 time domain orthogonal cover code (TD-OCC) is applied to the two symbols of DM-RS. Example ports for this DM-RS configuration are shown in 1401 to 1408 of FIG. 14 (8 ports in total). The frequency domain mapping of this DM-RS configuration is described in Equation (1). It is noted that the parameters (including TD-OCC $w_t(l')$ and FD-OCC $w_f(k')$) can be given by TABLE 1, below. Table 1 describes Parameters for example new DM-RS configuration.

$$k=4n+k'+\Delta \qquad (1)$$

TABLE 1

| p | λ | Δ | $w_f(k')$ | | $w_t(l')$ | |
|---|---|---|---|---|---|---|
| | | | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 2 | +1 | +1 | +1 | −1 |
| 1007 | 1 | 2 | +1 | −1 | +1 | −1 |

In another example DM-RS configuration, as illustrated in FIG. 15, four REs within an RB are mapped for DM-RS sequence. Here, two consecutive REs are further applied with length-2 frequency domain orthogonal cover code (FD-OCC), and a length-2 time domain orthogonal cover code (TD-OCC) is applied to the two symbols of DM-RS. Example ports for this DM-RS configuration are shown in 1501 to 1512 of FIG. 15 (12 ports in total). The frequency domain mapping of this DM-RS configuration is described in Equation (2). It is noted that the parameters (including TD-OCC $w_t(l')$ and FD-OCC $w_f(k')$) can be given by TABLE 2. TABLE 2 describes parameters for example new DM-RS configuration.

$$k=12n+k'+\Delta \qquad (2)$$

TABLE 2

| p | λ | Δ | $w_f(k')$ | | $w_t(l')$ | |
|---|---|---|---|---|---|---|
| | | | k' = 0, 2 | k' = 1, 3 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 4 | +1 | +1 | +1 | +1 |
| 1003 | 1 | 4 | +1 | −1 | +1 | +1 |
| 1004 | 2 | 8 | +1 | +1 | +1 | +1 |
| 1005 | 2 | 8 | +1 | −1 | +1 | +1 |
| 1006 | 0 | 2 | +1 | +1 | +1 | −1 |
| 1007 | 0 | 2 | +1 | −1 | +1 | −1 |
| 1008 | 1 | 4 | +1 | +1 | +1 | −1 |
| 1009 | 1 | 4 | +1 | −1 | +1 | −1 |
| 1010 | 2 | 8 | +1 | +1 | +1 | −1 |
| 1011 | 2 | 8 | +1 | −1 | +1 | −1 |

For yet another example DM-RS configuration, as illustrated in FIG. 16, twelve REs within an RB are mapped for DM-RS sequence, wherein two consecutive REs are further applied with length-2 frequency domain orthogonal cover code (FD-OCC), and a length-2 time domain orthogonal cover code (TD-OCC) is applied to the two symbols of DM-RS. Example ports for this DM-RS configuration are shown in 1601 to 1604 of FIG. 16 (4 ports in total). The frequency domain mapping of this DM-RS configuration is described in Equation (3). t is noted that the parameters (including TD-OCC $w_t(l')$ and FD-OCC $w_f(k')$) can be given by TABLE 3. TABLE 3 describes parameters for example new DM-RS configuration $$k=2n+k+\Delta \qquad (3)$$

TABLE 3

| p | λ | Δ | wf(k') | | $w_t(l')$ | |
|---|---|---|---|---|---|---|
| | | | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 0 | 0 | +1 | +1 | +1 | −1 |
| 1003 | 0 | 0 | +1 | −1 | +1 | −1 |

Embodiments of the present disclosure also describe FD-OCC enhancements.

In certain embodiments, there can be additionally UE assumption applied to existing DM-RS pattern, wherein the new UE assumption includes new assumption on FD-OCC.

In one approach, a UE (such as the UE 116) can assume all the remaining orthogonal antenna ports are not associated with transmission of PDSCH to another UE, when the configuration of DM-RS and/or the configuration of PDSCH satisfies certain condition(s).

In another approach, a UE (such as the UE 116) can assume all the remaining orthogonal antenna ports which have same RE mapping and different FD-OCC (e.g. the antenna port have different $w_f(k')$ from the one configured for that UE) are not associated with transmission of PDSCH to another UE, when the configuration of DM-RS and/or the configuration of PDSCH satisfies certain condition(s).

For example, when a UE is configured with DM-RS with $w_f(k')=\{+1, +1\}$ (for k'=0, 1 respectively), the UE assumes other orthogonal antenna ports which have same RE mapping and $w_f(k')=\{+1, −1\}$ (for k'=0, 1 respectively) are not associated with transmission of PDSCH to another UE. When a UE is configured with DM-RS with $w_f(k')=\{+1, −1\}$ (for k'=0, 1 respectively), the UE assumes other orthogonal antenna ports which have same RE mapping and $w_f(k')=\{+1, +1\}$ (for k'=0, 1 respectively) are not associated with transmission of PDSCH to another UE.

For a sub-example (regarding DM-RS configuration Type 1), if a UE (such as the UE 116) is assigned with the antenna port as 1000 or 1004, the UE assumes the antenna ports 1001 and 1005 are not associated with transmission of PDSCH to another UE, when the configuration of DM-RS and/or the configuration of PDSCH satisfies certain condition(s) as described in this disclosure.

For another sub-example (regarding DM-RS configuration Type 1), if a UE (such as the UE 116) is assigned with the antenna port as 1001 or 1005, the UE assumes the antenna ports 1000 and 1004 are not associated with transmission of PDSCH to another UE, when the configuration of DM-RS and/or the configuration of PDSCH satisfies certain condition(s) as described in this disclosure.

For another sub-example (regarding DM-RS configuration Type 1), if a UE (such as the UE 116) is assigned with the antenna port as 1002 or 1006, the UE assumes the antenna ports 1003 and 1007 are not associated with transmission of PDSCH to another UE, when the configuration of DM-RS and/or the configuration of PDSCH satisfies certain condition(s) as described in this disclosure.

For another sub-example (regarding DM-RS configuration Type 1), if a UE (such as the UE 116) is assigned with the antenna port as 1003 or 1007, the UE assumes the antenna ports 1002 and 1006 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is assigned with the antenna port as 1000 or 1006, the UE assumes the antenna ports 1001 and 1007 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is assigned with the antenna port as 1001 or 1007, the UE assumes the antenna ports 1000 and 1006 are not associated with transmission of PDSCH to another UE, when the configuration of DM-RS and/or the configuration of PDSCH satisfies certain condition(s) as described in this disclosure.

For another sub-example (regarding DM-RS configuration Type 2), If a UE (such as the UE 116) is assigned with the antenna port as 1002 or 1008, the UE assumes the antenna ports 1003 and 1009 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is assigned with the antenna port as 1003 or 1009, the UE assumes the antenna ports 1002 and 1008 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is assigned with the antenna port as 1004 or 1010, the UE assumes the antenna ports 1005 and 1011 are not associated with transmission of PDSCH to another UE, when the configuration of DM-RS and/or the configuration of PDSCH satisfies certain condition(s) as described in this disclosure.

For yet another sub-example (regarding DM-RS configuration Type 2), if a UE (such as the UE 116) is assigned with the antenna port as 1005 or 1011, the UE assumes the antenna ports 1004 and 1010 are not associated with transmission of PDSCH to another UE, when the configuration of DM-RS and/or the configuration of PDSCH satisfies certain condition(s) as described in this disclosure.

In another approach, a UE (such as the UE 116) can assume the FD-OCC is disabled, when the configuration of DM-RS and/or the configuration of PDSCH satisfies certain condition(s).

For example, the assumption of FD-OCC disabled refers to $w_f(k')=\{+1, +1\}$ (for k'=0, 1 respectively), regardless of the antenna port configuration. In this example, the UE may further assume that orthogonal antenna ports which have the same or similar RE mapping and different FD-OCC in the antenna port configuration may not be associated with transmission of PDSCH to another UE.

For another example, assumption of FD-OCC disabled refers to the UE only expects to be configured with antenna configuration with $w_f(k')=\{+1, +1\}$ (for k'=0, 1 respectively). In this example, the UE may further assume that orthogonal antenna ports which have same RE mapping and different FD-OCC in the antenna port configuration may not be associated with transmission of PDSCH to another UE.

For yet another approach, a UE (such as the UE 116) can assume the FD-OCC is disabled, and all the remaining orthogonal antenna ports are not associated with transmission of PDSCH to another UE, when the configuration of DM-RS and/or the configuration of PDSCH satisfies certain condition(s).

In certain embodiments, there can be a RRC configuration indicating an assumption on the FD-OCC. For example, the RRC configuration can be cell-specific. For another example, the RRC configuration can be UE-specific.

In one approach, if a UE (such as the UE 116) is provided with a RRC parameter, the UE can assume all the remaining orthogonal antenna ports are not associated with transmission of PDSCH to another UE, wherein the configuration of DM-RS and/or the configuration of PDSCH may further satisfy certain condition(s).

In another approach, if a UE (such as the UE 116) is provided with a RRC parameter, the UE can assume all the remaining orthogonal antenna ports which have same RE mapping and different FD-OCC (e.g. the antenna port have different $w_f(k')$ from the one configured for that UE) are not associated with transmission of PDSCH to another UE, when the configuration of DM-RS and/or the configuration of PDSCH satisfies certain condition(s).

For example, when a UE (such as the UE 116) is configured with DM-RS with $w_f(k')=\{+1, +1\}$ (for k'=0, 1 respectively), the UE assumes other orthogonal antenna ports which have same RE mapping and $w_f(k')=\{+1, -1\}$ (for k'=0, 1 respectively) are not associated with transmission of PDSCH to another UE; when a UE is configured with DM-RS with $w_f(k')=\{+1, -1\}$ (for k'=0, 1 respectively), the UE assumes other orthogonal antenna ports which have same RE mapping and $w_f(k')=\{+1, +1\}$ (for k'=0, 1 respectively) are not associated with transmission of PDSCH to another UE.

For a sub-example (regarding DM-RS configuration Type 1), if a UE (such as the UE 116) is provided with a RRC parameter and assigned with the antenna port as 1000 or 1004, the UE assumes the antenna ports 1001 and 1005 are not associated with transmission of PDSCH to another UE, when the configuration of DM-RS and/or the configuration of PDSCH satisfies certain condition(s) as described in this disclosure.

For another sub-example (regarding DM-RS configuration Type 1), if a UE (such as the UE 116) is provided with a RRC parameter and assigned with the antenna port as 1001 or 1005, the UE assumes the antenna ports 1000 and 1004 are not associated with transmission of PDSCH to another UE, when the configuration of DM-RS and/or the configuration of PDSCH satisfies certain condition(s) as described in this disclosure.

For another sub-example (regarding DM-RS configuration Type 1), if a UE (such as the UE 116) is provided with a RRC parameter and assigned with the antenna port as 1002 or 1006, the UE assumes the antenna ports 1003 and 1007 are not associated with transmission of PDSCH to another UE, when the configuration of DM-RS and/or the configuration of PDSCH satisfies certain condition(s) as described in this disclosure.

For another sub-example (regarding DM-RS configuration Type 1), if a UE (such as the UE 116) is provided with a RRC parameter and assigned with the antenna port as 1003 or 1007, the UE assumes the antenna ports 1002 and 1006 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is provided with a RRC parameter and assigned with the antenna port as 1000 or 1006, the UE assumes the antenna ports 1001 and 1007 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is provided with a RRC parameter and assigned with the antenna port as 1001 or 1007, the UE assumes the antenna ports 1000 and 1006 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is provided with a RRC parameter and assigned with the antenna port as 1002 or 1008, the UE assumes the antenna ports 1003 and 1009 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is provided with a RRC parameter and assigned with the antenna port as 1003 or 1009, the UE assumes the antenna ports 1002 and 1008 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is provided with a RRC parameter and assigned with the antenna port as 1004 or 1010, the UE assumes the antenna ports 1005 and 1011 are not associated with transmission of PDSCH to another UE, when the configuration of DM-RS and/or the configuration of PDSCH satisfies certain condition(s) as described in this disclosure.

For yet another sub-example (regarding DM-RS configuration Type 2), if a UE (such as the UE 116) is provided with a RRC parameter and assigned with the antenna port as 1005 or 1011, the UE assumes the antenna ports 1004 and 1010 are not associated with transmission of PDSCH to another UE, when the configuration of DM-RS and/or the configuration of PDSCH satisfies certain condition(s) as described in this disclosure.

In another approach, if a UE (such as the UE 116) is provided with a RRC parameter, the UE can assume the FD-OCC is disabled, wherein the configuration of DM-RS and/or the configuration of PDSCH may further satisfy certain condition(s).

For yet another approach, if a UE (such as the UE 116) is provided with a RRC parameter, the UE can assume the FD-OCC is disabled, and all the remaining orthogonal antenna ports are not associated with transmission of PDSCH to another UE, wherein the configuration of DM-RS and/or the configuration of PDSCH may further satisfy certain condition(s).

In certain embodiments, there can be an indication in the DCI (e.g. a field in the DCI) including an assumption on the FD-OCC.

In one approach, if a UE (such as the UE 116) is provided with the field in the DCI, the UE can assume all the remaining orthogonal antenna ports are not associated with transmission of PDSCH to another UE. The configuration of DM-RS and/or the configuration of PDSCH may further satisfy certain condition(s).

In another approach, if a UE (such as the UE 116) is provided with the field in the DCI, the UE can assume all the remaining orthogonal antenna ports which have same RE mapping and different FD-OCC (e.g. the antenna port have different $w_f(k')$ from the one configured for that UE) are not associated with transmission of PDSCH to another UE, when the configuration of DM-RS and/or the configuration of PDSCH satisfies certain condition(s). For example, when a UE is configured with DM-RS with $w_f(k')=\{+1, +1\}$ (for k'=0,1 respectively), the UE assumes other orthogonal antenna ports which have same RE mapping and $w_f(k')=\{+1, -1\}$ (for k'=0, 1 respectively) are not associated with transmission of PDSCH to another UE; when a UE is configured with DM-RS with $w_f(k')=\{+1, -1\}$ (for k'=0, 1 respectively), the UE assumes other orthogonal antenna ports which have same RE mapping and $w_f(k')=\{+1, +1\}$ (for k'=0, 1 respectively) are not associated with transmission of PDSCH to another UE.

For a sub-example (regarding DM-RS configuration Type 1), if a UE (such as the UE 116) is provided with the field in the DCI and assigned with the antenna port as 1000 or 1004, the UE assumes the antenna ports 1001 and 1005 are not associated with transmission of PDSCH to another UE, when the configuration of DM-RS and/or the configuration of PDSCH satisfies certain condition(s) as described in this disclosure.

For another sub-example (regarding DM-RS configuration Type 1), if a UE (such as the UE 116) is provided with the field in the DCI and assigned with the antenna port as 1001 or 1005, the UE assumes the antenna ports 1000 and 1004 are not associated with transmission of PDSCH to another UE, when the configuration of DM-RS and/or the configuration of PDSCH satisfies certain condition(s) as described in this disclosure.

For another sub-example (regarding DM-RS configuration Type 1), if a UE (such as the UE 116) is provided with the field in the DCI and assigned with the antenna port as 1002 or 1006, the UE assumes the antenna ports 1003 and 1007 are not associated with transmission of PDSCH to another UE, when the configuration of DM-RS and/or the configuration of PDSCH satisfies certain condition(s) as described in this disclosure.

For another sub-example (regarding DM-RS configuration Type 1), if a UE (such as the UE 116) is provided with the field in the DCI and assigned with the antenna port as 1003 or 1007, the UE assumes the antenna ports 1002 and 1006 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is provided with the field in the DCI and assigned with the antenna port as 1000 or 1006, the UE assumes the antenna ports 1001 and 1007 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is provided with the field in the DCI and assigned with the antenna port as 1001 or 1007, the UE assumes the antenna ports 1000 and 1006 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is provided with the field in the DCI and assigned with the antenna port as 1002 or 1008, the UE assumes the antenna ports 1003 and 1009 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is provided with the field in the DCI and assigned with the antenna port as 1003 or 1009, the UE assumes the antenna ports 1002 and 1008 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is provided with the field in the DCI and assigned with the antenna port as 1004 or 1010, the UE assumes the antenna ports 1005 and 1011 are not associated with transmission of PDSCH to another UE, when the configuration of DM-RS and/or the configuration of PDSCH satisfies certain condition(s) as described in this disclosure.

For yet another sub-example (regarding DM-RS configuration Type 2), if a UE (such as the UE 116) is provided with the field in the DCI and assigned with the antenna port as 1005 or 1011, the UE assumes the antenna ports 1004 and 1010 are not associated with transmission of PDSCH to another UE, when the configuration of DM-RS and/or the configuration of PDSCH satisfies certain condition(s) as described in this disclosure.

In another approach, if a UE (such as the UE 116) is provided with the field in the DCI, the UE can assume the FD-OCC is disabled, wherein the configuration of DM-RS and/or the configuration of PDSCH may further satisfy certain condition(s).

In another approach, if a UE (such as the UE 116) is provided with the field in the DCI, the UE can assume the FD-OCC is disabled, and all the remaining orthogonal antenna ports are not associated with transmission of PDSCH to another UE, wherein the configuration of DM-RS and/or the configuration of PDSCH may further satisfy certain condition(s).

In certain embodiments, there can be at least one new antenna port configuration supported in a DCI format, wherein the at least one new antenna port configuration includes new assumption on FD-OCC.

In one approach, at least one of the reserved rows for antenna port configuration table indicated by DCI is used for indicating the new assumption on FD-OCC, and if a UE (such as the UE 116) is configured with such configuration by DCI, the UE can assume all the remaining orthogonal antenna ports are not associated with transmission of PDSCH to another UE, wherein the configuration of DM-RS and/or the configuration of PDSCH may further satisfy certain condition(s).

In another approach, at least one of the reserved rows for antenna port configuration table indicated by DCI is used for indicating the new assumption on FD-OCC, and if a UE (such as the UE 116) is configured with such configuration by DCI, the UE can assume all the remaining orthogonal antenna ports which have same RE mapping and different FD-OCC (e.g. the antenna port have different $w_f(k')$ from the one configured for that UE) are not associated with transmission of PDSCH to another UE, when the configuration of DM-RS and/or the configuration of PDSCH satisfies certain condition(s). For example, when a UE (such as the UE 116) is configured with DM-RS with $w_f(k')=\{+1, +1\}$ (for k'=0, 1 respectively), the UE assumes other orthogonal antenna ports which have same RE mapping and $w_f(k')=\{+1, -1\}$ (for k'=0, 1 respectively) are not associated with transmission of PDSCH to another UE; when a UE (such as the UE 116) is configured with DM-RS with $w_f(k')=\{+1, -1\}$ (for k'=0, 1 respectively), the UE assumes other orthogonal antenna ports which have same RE mapping and $w_f(k')=\{+1, +1\}$ (for k'=0, 1 respectively) are not associated with transmission of PDSCH to another UE.

For a sub-example (regarding DM-RS configuration Type 1), if a UE (such as the UE 116) is configured with such configuration by DCI and assigned with the antenna port as 1000 or 1004, the UE assumes the antenna ports 1001 and 1005 are not associated with transmission of PDSCH to another UE, when the configuration of DM-RS and/or the configuration of PDSCH satisfies certain condition(s) as described in this disclosure.

For another sub-example (regarding DM-RS configuration Type 1), if a UE (such as the UE 116) is configured with such configuration by DCI and assigned with the antenna port as 1001 or 1005, the UE assumes the antenna ports 1000 and 1004 are not associated with transmission of PDSCH to another UE, when the configuration of DM-RS and/or the configuration of PDSCH satisfies certain condition(s) as described in this disclosure.

For another sub-example (regarding DM-RS configuration Type 1), if a UE (such as the UE 116) is configured with such configuration by DCI and assigned with the antenna port as 1002 or 1006, the UE assumes the antenna ports 1003 and 1007 are not associated with transmission of PDSCH to another UE, when the configuration of DM-RS and/or the configuration of PDSCH satisfies certain condition(s) as described in this disclosure.

For another sub-example (regarding DM-RS configuration Type 1), if a UE (such as the UE 116) is configured with such configuration by DCI and assigned with the antenna port as 1003 or 1007, the UE assumes the antenna ports 1002 and 1006 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is configured with such configuration by DCI and assigned with the antenna port as 1000 or 1006, the UE assumes the antenna ports 1001 and 1007 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is configured with such configuration by DCI and assigned with the antenna port as 1001 or 1007, the UE assumes the antenna ports 1000 and 1006 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is configured with such configuration by DCI and assigned with the antenna port as 1002 or 1008, the UE assumes the antenna ports 1003 and 1009 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is configured with such configuration by DCI and assigned with the antenna port as 1003 or 1009, the UE assumes the antenna ports 1002 and 1008 are not associated with transmission of PDSCH to another UE, when the configuration of DM-RS and/or the configuration of PDSCH satisfies certain condition(s) as described in this disclosure.

For another sub-example (regarding DM-RS configuration Type 2), if a UE (such as the UE 116) is configured with such configuration by DCI and assigned with the antenna port as 1004 or 1010, the UE assumes the antenna ports 1005 and 1011 are not associated with transmission of PDSCH to another UE, when the configuration of DM-RS and/or the configuration of PDSCH satisfies certain condition(s) as described in this disclosure.

For yet another sub-example (regarding DM-RS configuration Type 2), if a UE (such as the UE 116) is configured with such configuration by DCI and assigned with the antenna port as 1005 or 1011, the UE assumes the antenna ports 1004 and 1010 are not associated with transmission of PDSCH to another UE, when the configuration of DM-RS and/or the configuration of PDSCH satisfies certain condition(s) as described in this disclosure.

In another approach, at least one of the reserved rows for antenna port configuration table indicated by DCI is used for indicating the new assumption on FD-OCC, and if a UE (such as the UE 116) is configured with such configuration by DCI, the UE can assume the FD-OCC is disabled, wherein the configuration of DM-RS and/or the configuration of PDSCH may further satisfy certain condition(s).

In yet another approach, at least one of the reserved rows for antenna port configuration table indicated by DCI is used for indicating the new assumption on FD-OCC, and if a UE (such as the UE 116) is configured with such configuration by DCI, the UE can assume the FD-OCC is disabled, and all the remaining orthogonal antenna ports are not associated with transmission of PDSCH to another UE, wherein the configuration of DM-RS and/or the configuration of PDSCH may further satisfy certain condition(s).

In one implementation of the embodiments of this disclosure, the certain condition(s) to be satisfied for the configuration of DM-RS and/or the configuration of PDSCH include at least one of the following eight components (including the combination of components).

In a first component, the condition for applying the new UE assumption (e.g. including a new UE assumption on the FD-OCC) includes a value of rank for the configuration of the PDSCH. For example, the condition can include the rank for PDSCH to be one.

In a second component, the condition for applying the new UE assumption (e.g. including a new UE assumption on the FD-OCC) includes a value of the number of DM-RS antenna ports configured by the DCI. For example, the condition can include the number of DM-RS antenna ports configured by the DCI as one.

In a third component, the condition for applying the new UE assumption (e.g. including a new UE assumption on the FD-OCC) includes a value of the index(es) of DM-RS antenna ports. For example, the condition can include a value of the index(es) of DM-RS antenna ports corresponding to FD-OCC as $w_f(k')=\{+1, +1\}$ (for k'=0, 1 respectively).

In a fourth component, the condition for applying the new UE assumption (e.g. including a new UE assumption on the FD-OCC) includes a value of the index(es) for antenna port configuration in the DCI. For instance, only a subset of the index(es) for antenna port configuration in the DCI is applicable to the new UE assumptions.

For example, the condition for applying the new UE assumption can be for DM-RS configuration Type 1 and if a UE (such as the UE 116) is scheduled with one codeword and assigned with the antenna port mapping with indices of {0, 1, 3, 4, 5, 6} or its subset in Table 7.3.1.2.2-1 of Clause 7.3.1.2 of REF2.

For another example, the condition for applying the new UE assumption can be for DM-RS configuration Type 1 and if a UE (such as the UE 116) is scheduled with one codeword and assigned with the antenna port mapping with indices of {0, 1, 3, 4, 5, 6} or its subset in Table 7.3.1.2.2-1A of Clause 7.3.1.2 of REF2.

For another example, the condition for applying the new UE assumption can be for DM-RS configuration Type 1 and if a UE (such as the UE 116) is scheduled with one codeword and assigned with the antenna port mapping with indices of {0, 1, 3, 4, 5, 6, 12, 13, 14, 15, 16, 17, 18, 19} or its subset in Table 7.3.1.2.2-2 of Clause 7.3.1.2 of REF2.

For another example, the condition for applying the new UE assumption can be for DM-RS configuration Type 1 and if a UE (such as the UE 116) is scheduled with one codeword and assigned with the antenna port mapping with indices of {0, 1, 3, 4, 5, 6, 12, 13, 14, 15, 16, 17, 18, 19} or its subset in Table 7.3.1.2.2-2A of Clause 7.3.1.2 of REF2.

For another example, the condition for applying the new UE assumption can be for DM-RS configuration Type 2 and if a UE (such as the UE 116) is scheduled with one codeword and assigned with the antenna port mapping with indices of {0, 1, 3, 4, 5, 6, 11, 12, 13, 14, 15, 16} or its subset in Table 7.3.1.2.2-3 of Clause 7.3.1.2 of REF2.

For another example, the condition for applying the new UE assumption can be for DM-RS configuration Type 2 and if a UE (such as the UE 116) is scheduled with one codeword and assigned with the antenna port mapping with indices of {0, 1, 3, 4, 5, 6, 11, 12, 13, 14, 15, 16} or its subset in Table 7.3.1.2.2-3A of Clause 7.3.1.2 of REF2.

For another example, the condition for applying the new UE assumption can be for DM-RS configuration Type 2 and if a UE (such as the UE 116) is scheduled with one codeword and assigned with the antenna port mapping with indices of {0, 1, 3, 4, 5, 6, 11, 12, 13, 14, 15, 16, 24, 25, 26, 27, 28, 29, 30, 31, 32, 33, 34, 35, 48, 49, 50, 51} or its subset in Table 7.3.1.2.2-4 of Clause 7.3.1.2 of REF2.

For yet another example, the condition for applying the new UE assumption can be for DM-RS configuration Type 2 and if a UE (such as the UE 116) is scheduled with one codeword and assigned with the antenna port mapping with indices of {0, 1, 3, 4, 5, 6, 11, 12, 13, 14, 15, 16, 24, 25, 26, 27, 28, 29, 30, 31, 32, 33, 34, 35, 48, 49, 50, 51} or its subset in Table 7.3.1.2.2-4A of Clause 7.3.1.2 of REF2.

In a fifth component, the condition for applying the new UE assumption (e.g. including a new UE assumption on the FD-OCC) includes a value of modulation and coding scheme (MCS). For example, the condition can include a value of MCS to be larger than a predefined threshold.

In a sixth component, the condition for applying the new UE assumption (e.g. including a new UE assumption on the FD-OCC) includes a value of modulation. For instance, the condition can include a value of modulation as 16 QAM and/or 64 QAM and/or 1024 QAM.

For example, the condition for applying the new UE assumption can be if the UE is configured with a MCS index which corresponds to a modulation order at least as 4, e.g. $Q_m \geq 4$ in Table 5.1.3.1-1 and/or Table 5.1.3.1-2 and/or Table 5.1.3.1-3 of REF4.

For another example, the condition for applying the new UE assumption can be if the UE is configured with a MCS index which corresponds to a modulation order at least as 6, e.g. $Q_m \geq 6$ in Table 5.1.3.1-1 and/or Table 5.1.3.1-2 and/or Table 5.1.3.1-3 of REF4.

For yet another one example, the condition for applying the new UE assumption can be if the UE is configured with a MCS index which corresponds to a modulation order at least as 8, e.g. $Q_m \geq 8$ in Table 5.1.3.1-2 of REF4.

In a seventh component, the condition for applying the new UE assumption (e.g. including a new UE assumption on the FD-OCC) includes a type of DM-RS. For example, the condition can include a type of DM-RS as Type 1.

In an eighth component, the condition for applying the new UE assumption (e.g. including a new UE assumption on the FD-OCC) includes a value of subcarrier spacing (SCS). For example, the condition can include a SCS for DM-RS and PDSCH as 480 kHz or 960 kHz.

Figure 17:
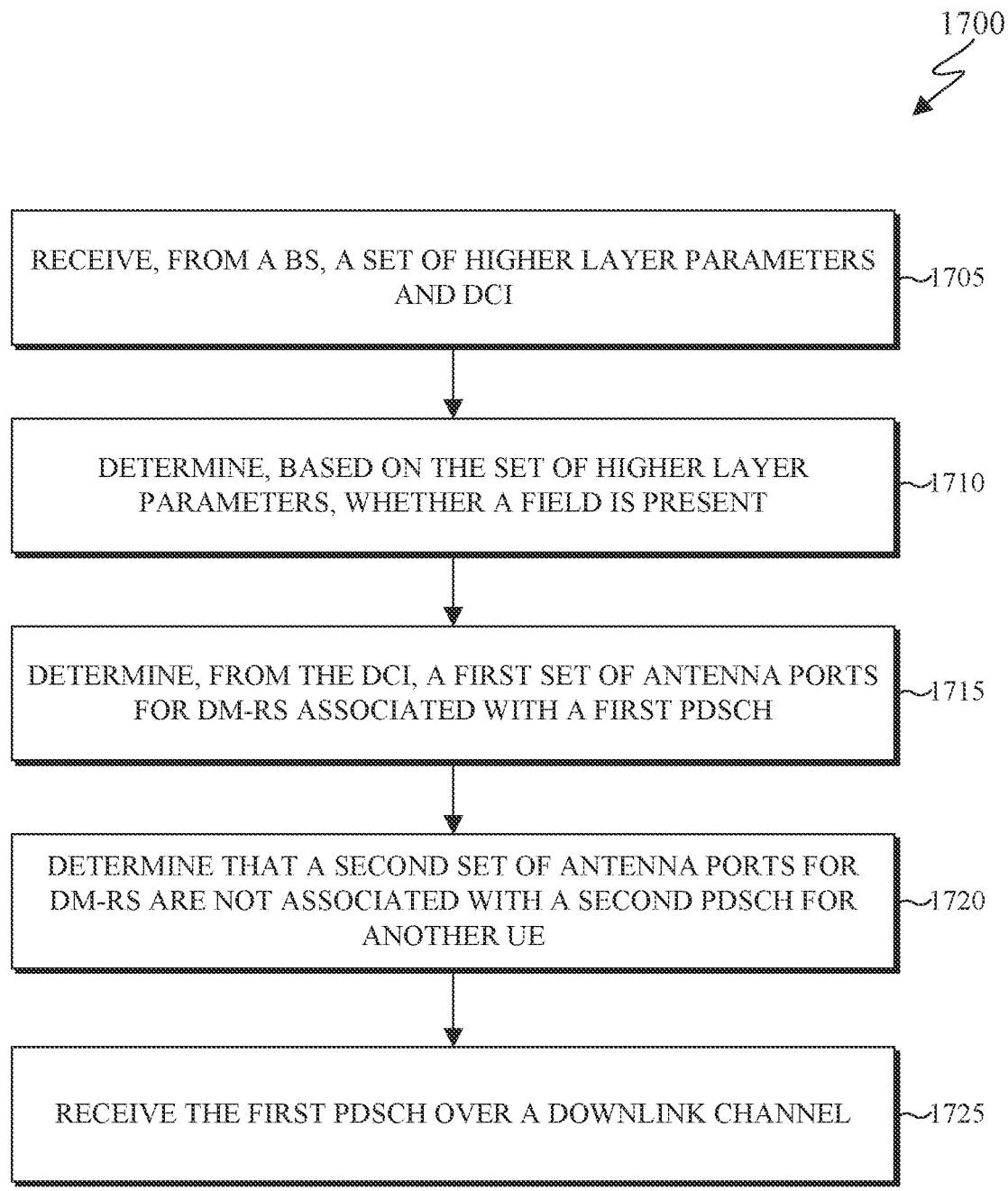
FIG. 17 illustrates an example method for receiving a PDSCH according to embodiments of the present disclosure.

FIG. 17 illustrates an example method 1700 for receiving a PDSCH according to embodiments of the present disclosure. An embodiment of the method 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. For example, the method 1700 may be performed by any of the UEs 111-116 in FIG. 1 and an analogous process may be implemented by any of the BS s 101-103 in FIG. 1.

The method 1700 begins with the UE receiving, from a BS, a set of higher layer parameters and DCI (step 1705). Thereafter, the UE determines, based on the set of higher layer parameters, whether a field is present (step 1710).

The UE then determines, from the DCI, a first set of antenna ports for DM-RS associated with a first PDSCH (step 1715). For example, in step 1715, a number of antenna ports in the first set of antenna ports for DM-RS is one and a SCS of the DM-RS of the first or second sets of antenna ports as one of 480 kHz or 960 kHz. In various embodiments, the UE may also determine a set of multiple PDSCHs scheduled by the DCI, determine a threshold from the set of higher layer parameters, and determine a first portion of one or more PDSCHs from the set of multiple PDSCHs, where an offset between the DCI and the first portion of one or more PDSCH is smaller than the threshold, and a second portion of one or more PDSCHs from the set of multiple PDSCHs, where the offset between the DCI and the second portion of one or more PDSCH is larger than or equal to the threshold.

In various embodiments, the UE may also determine, for each PDSCH in the first portion of one or more PDSCHs, DM-RS ports of the each PDSCH are assumed to be QCLed with RS s used for PDCCH QCL indication of a CORESET associated with a monitored search space with lowest ID in a latest slot with respect to the PDSCH, in which one or more CORESETs within an active BWP of a serving cell are monitored by the UE.

In various embodiments, the UE may also determine whether an activated TCI state is present from the DCI; and determining the second portion of the one or more PDSCHs: in response to a determination that the activated TCI state is present, have a same TCI state, wherein the same TCI state is provided by the activated TCI state; or in response to a determination that the activated TCI state is not present, have a TCI state or QCL assumption corresponding to a CORESET used for reception of a physical downlink control channel (PDCCH) within an active BWP of a serving cell, wherein the PDCCH includes the DCI.

Thereafter, the UE determines that a second set of antenna ports for DM-RS are not associated with a second PDSCH for another UE (step 1720). For example, in step 1720, the UE determines that the second set of antenna ports for DM-RS are not associated with a second PDSCH for another UE in response to a determination that the field from the set of higher layer parameters is present. In various embodiments, the second set of antenna ports for DM-RS: are orthogonal to the first set of antenna ports for DM-RS; have a same resource element mapping as the first set of antenna ports for DM-RS; and have a different FD-OCC $w_f(k')$ from the first set of antenna ports for DM-RS.

The UE then receives the first PDSCH over a downlink channel. (step 1725). For example, in step 1725, the UE may receive the PDSCH based on the same TCI state and/or the QCL assumption.

Although FIG. 17 illustrates example method 1700, various changes may be made to FIG. 17. For example, while the method 1700 is shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a terminal in a wireless communication system, the method comprising:
   receiving, from a base station, a radio resource control (RRC) message;
   determining whether the RRC message includes information associated with frequency domain orthogonal cover codes (FD-OCC); and
   receiving, from the base station, downlink control information for scheduling a first physical downlink shared channel (PDSCH) to the terminal based on a first set of orthogonal antenna ports, wherein, in case that the information is included in the RRC message, a second set of orthogonal antenna ports having a different FD-OCC from a FD-OCC configured for the first set of orthogonal antenna ports are not associated with a transmission of a second PDSCH of another terminal.

2. The method of claim 1, wherein the second set of the orthogonal antenna ports have a same resource element mapping of the first set of orthogonal antenna ports.

3. The method of claim 1, wherein the terminal is scheduled with the first PDSCH with a single demodulation reference signal (DM-RS) antenna port.

4. The method of claim 1, wherein a subcarrier spacing (SCS) for the first PDSCH is 480 or 960 kHz.

5. The method of claim 1, wherein the information is a user equipment (UE)-specific parameter.

6. A method performed by a base station in a wireless communication system, the method comprising:
    determining whether to transmit information associated with frequency domain orthogonal cover codes (FD-OCC) to a first terminal;
    in case that it is determined to transmit the information to the first terminal, transmitting, to the first terminal, a radio resource control (RRC) message including the information;
    transmitting, to the first terminal, a downlink control information for scheduling a first physical downlink shared channel (PDSCH) to the first terminal based on a first set of orthogonal antenna ports; and
    determining that a second set of orthogonal antenna ports having a different FD-OCC from a FD-OCC configured for the first set of orthogonal antenna ports are not associated with a transmission of a second PDSCH of a second terminal.

7. The method of claim 6, wherein the second set of the orthogonal antenna ports have a same resource element mapping of the first set of orthogonal antenna ports.

8. The method of claim 6, wherein the first terminal is scheduled with the first PDSCH with a single demodulation reference signal (DM-RS) antenna port.

9. The method of claim 6, wherein a subcarrier spacing (SCS) for the first PDSCH is 480 or 960 kHz.

10. The method of claim 6, wherein the information is a user equipment (UE)-specific parameter.

11. A terminal in a wireless communication system, the terminal comprising:
    a transceiver configured to receive, from a base station, a radio resource control (RRC) message; and
    a processor operably coupled with the transceiver, the processor and configured to determine whether the RRC message includes information associated with frequency domain orthogonal cover codes (FD-OCC), and wherein the transceiver is further configured to receive, from the base station, downlink control information for scheduling a first physical downlink shared channel (PDSCH) to the terminal based on a first set of orthogonal antenna ports,
wherein, in case that the information is included in the RRC message, a second set of orthogonal antenna ports having a different FD-OCC from a FD-OCC configured for the first set of orthogonal antenna ports are not associated with a transmission of a second PDSCH of another terminal.

12. The terminal of claim 11, wherein the second set of the orthogonal antenna ports have a same resource element mapping of the first set of orthogonal antenna ports.

13. The terminal of claim 11, wherein the terminal is scheduled with the first PDSCH with a single demodulation reference signal (DM-RS) antenna port.

14. The terminal of claim 11, wherein a subcarrier spacing (SCS) for the first PDSCH is 480 or 960 kHz.

15. The terminal of claim 11, wherein the information is a user equipment (UE)-specific parameter.

16. A base station in a wireless communication system, the base station comprising:
    a processor configured to determine whether to transmit information associated with frequency domain orthogonal cover codes (FD-OCC) to a first terminal; and
    a transceiver operably coupled with the processor, the transceiver configured to:
        in case that it is determined to transmit the information to the first terminal, transmit, to the first terminal, a radio resource control (RRC) message including the information, and
        transmit, to the first terminal, a downlink control information for scheduling a first physical downlink shared channel (PDSCH) to the first terminal based on a first set of orthogonal antenna ports,
    wherein the processor is further configured to determine that a second set of remaining orthogonal antenna ports having a different FD-OCC from a FD-OCC configured for the first set of orthogonal antenna ports are not associated with a transmission of a second PDSCH of a second terminal.

17. The base station of claim 16, wherein the second set of the orthogonal antenna ports have a same resource element mapping of the first set of orthogonal antenna ports.

18. The base station of claim 16, wherein the first terminal is scheduled with the first PDSCH with a single demodulation reference signal (DM-RS) antenna port.

19. The base station of claim 16, wherein a subcarrier spacing (SCS) for the first PDSCH is 480 or 960 kHz.

20. The base station of claim 16, wherein the information is a user equipment (UE)-specific parameter.

* * * * *